(12) United States Patent
Stegmann et al.

(10) Patent No.: US 12,496,860 B2
(45) Date of Patent: Dec. 16, 2025

(54) HUB CAP SYSTEM FOR A VEHICLE

(71) Applicant: SAF-HOLLAND GmbH, Bessenbach (DE)

(72) Inventors: Rainer Stegmann, Hösbach (DE); Muhammet Arpaci, Aschaffenburg (DE); André Katzke, Weibersbrunn (DE); Elmar Weber, Dülmen (DE); Simon Schäfers, Nidderau-Erbstadt (DE)

(73) Assignee: SAF-HOLLAND GmbH, Bessenbach (DE)

( * ) Notice: Subject to any disclaimer, the term of this patent is extended or adjusted under 35 U.S.C. 154(b) by 1 day.

(21) Appl. No.: 18/683,989

(22) PCT Filed: Aug. 24, 2022

(86) PCT No.: PCT/EP2022/073588
§ 371 (c)(1),
(2) Date: Feb. 15, 2024

(87) PCT Pub. No.: WO2023/025849
PCT Pub. Date: Mar. 2, 2023

(65) Prior Publication Data
US 2024/0351382 A1 Oct. 24, 2024

(30) Foreign Application Priority Data
Aug. 26, 2021 (DE) ...................... 10 2021 122 133.1

(51) Int. Cl.
B60C 29/02 (2006.01)
B60B 7/06 (2006.01)
(Continued)

(52) U.S. Cl.
CPC ................ *B60C 29/02* (2013.01); *B60B 7/06* (2013.01); *B60B 7/20* (2013.01); *B60C 23/00318* (2020.05); *B60C 23/00354* (2020.05)

(58) Field of Classification Search
CPC .......... B60C 23/00327; B60C 23/0345; B60C 23/0036; B60C 23/00354
(Continued)

(56) References Cited

U.S. PATENT DOCUMENTS 6,425,427 B1    7/2002  Stech
9,370,974 B2 *  6/2016  Knapke ............. B60C 23/00363
(Continued)

FOREIGN PATENT DOCUMENTS

DE    60109131 T2   4/2006
EP     1738936 A1   1/2007
(Continued)

OTHER PUBLICATIONS

European Patent Office; International Search Report; Nov. 17, 2022; entire document.

*Primary Examiner* — Robert K Arundale
(74) *Attorney, Agent, or Firm* — Price Heneveld LLP

(57) ABSTRACT

The hub cap system for a vehicle, in particular a commercial vehicle, includes a hub cap configured to rotate about an axial direction, wherein the hub cap has a central aperture which extends in the axial direction, and an air guiding system including a primary connection and a secondary connection, wherein the air guiding system extends partially into or through the central aperture.

9 Claims, 15 Drawing Sheets

(51) Int. Cl.
*B60B 7/20* (2006.01)
*B60C 23/00* (2006.01)

(58) Field of Classification Search
USPC .................................................. 301/108.1
See application file for complete search history.

(56) References Cited

U.S. PATENT DOCUMENTS

| | | | | |
|---|---|---|---|---|
| 11,376,898 | B1* | 7/2022 | Begley | B60C 23/00336 |
| 2002/0124926 | A1* | 9/2002 | Colussi | B60C 23/00354 |
| | | | | 152/417 |
| 2005/0194079 | A1* | 9/2005 | Hennig | B60C 23/00363 |
| | | | | 152/417 |
| 2009/0241655 | A1* | 10/2009 | Ingram | B60C 23/00318 |
| | | | | 73/146.3 |
| 2013/0015698 | A1* | 1/2013 | Butler | B60B 7/066 |
| | | | | 301/37.29 |
| 2014/0271261 | A1* | 9/2014 | Boelryk | B60C 23/137 |
| | | | | 417/233 |
| 2018/0072111 | A1* | 3/2018 | Cappello | B60C 23/00372 |
| 2018/0170124 | A1* | 6/2018 | Dodu | B60C 23/00354 |
| 2018/0345740 | A1* | 12/2018 | Vitolo | B60C 23/00345 |
| 2018/0345741 | A1* | 12/2018 | Vitolo | B60C 23/00354 |
| 2022/0379668 | A1* | 12/2022 | Wasserfuhr | B60C 23/00345 |

FOREIGN PATENT DOCUMENTS

| | | |
|---|---|---|
| WO | 2017040802 A1 | 3/2017 |
| WO | 2018136826 A1 | 6/2018 |
| WO | 2020215063 A2 | 10/2020 |
| WO | 2020224703 A1 | 11/2020 |

* cited by examiner

HUB CAP SYSTEM FOR A VEHICLE

BACKGROUND

The invention relates to a hub cap system for a vehicle and a vehicle, in particular a commercial vehicle, comprising a hub cap system and a method for mounting a hub cap system.

It is known from the state of the art to provide tire pressure regulation systems which are particularly suitable for automatically regulating the air pressure of tires while driving. The automatic regulation of the air pressure can have the advantage that the tires have an optimum air pressure at all times, which can result in less wear on the tires and lower energy consumption when driving. For this purpose, a compressed air supply arranged in the vehicle is generally used, which is connected to the tires with the aid of an air guiding system. The air guiding system is arranged in particular on the tires or in the vicinity of the tires and is connected to the compressed air supply of the vehicle by means of a connection of compressed air hoses. However, such air guiding systems are often delicate components that can easily be damaged during transportation of the axles, e.g. before installation, especially if they protrude from a hub cap. In the state of the art, it is therefore common practice to attach corresponding air guiding systems to the hub cap only when the axle is installed. For example, by screwing the air guiding system into an internal thread of the hub cap. However, this often means more work during installation and there are often additional waste parts that are attached, for example, to protect the interior of the wheel hub before the air guiding system is installed. Another disadvantage is that a rotational position of the air guiding system is usually not predetermined, which can often result in a twisted installation position of the air guiding system, which in turn can lead to the air guiding system or hoses connected to it obscuring information texts and/or logos.

It is therefore an object of the invention to provide a hub cap system in which, on the one hand, a corresponding air guiding system is protected from harmful influences during transportation of the hub cap system and/or the axle on which the hub cap system is arranged. Furthermore, if possible, a twisted arrangement of the air guiding system on the hub cap should be prevented.

SUMMARY

According to the invention, a hub cap system for a vehicle, in particular a commercial vehicle, comprising a hub cap and an air guiding system, wherein the hub cap is adapted to rotate about an axial direction, wherein the hub cap has a central aperture which extends in particular in or parallel to the axial direction, wherein the air guiding system has a primary connection and a secondary connection, wherein the air guiding system extends partially into or through the central aperture. The commercial vehicle can preferably be a motor vehicle and/or a trailer. In particular, the vehicle may be a road-going vehicle and/or a road-bound vehicle. The commercial vehicle is preferably a vehicle with a permissible total weight of more than 3.5 tons, preferably more than 7.5 tons and particularly preferably more than 18 tons. The hub cap can preferably be designed to be placed on a wheel hub, in particular as a type of cover. The hub cap can have fastening means for fastening to a wheel hub. The hub cap can be designed to prevent the ingress of dirt or foreign bodies in general into an interior of the wheel hub. The axial direction can correspond to the direction of an axis of rotation about which the hub cap has, at least approximately, a rotational symmetry. In this context, at least approximately can be understood to mean in particular that minor deviations, such as writing on the hub cap and/or structural inaccuracies, are negligible. Alternatively, or additionally preferably, the axial direction can be the direction in which the main axis of the hub cap runs and/or in the direction of which the hub cap has the smallest extension. In particular, the axial direction can correspond to the direction of rotation of a wheel axle to which the hub cap can be attached. The central aperture is preferably arranged centrally in or on the hub cap. The central aperture preferably represents a connection between a first side of the hub cap and a second side, in particular a second side of the hub opposite the first side. The central aperture can preferably have a round cross-section. In particular, the central aperture can be cylindrical in shape, at least in sections. Alternatively, or additionally, the central aperture can have deviations from a perfectly round or cylindrical design, for example in that fastening means are arranged in the aperture for fastening the air guiding system. The air guiding system extends at least partially into or through the central aperture. Advantageously, the air guiding system can thus be protected from external damaging influences. The air guiding system can comprise a rotary feedthrough and/or be a rotary feedthrough. According to a preferred embodiment, the primary connection may be arranged on a first side of the hub cap, and the secondary connection may be arranged on a second side of the hub cap. Alternatively or additionally, the primary connection and/or the secondary connection can be arranged inside the central aperture. The primary connection can be designed to be connectable to a compressed air line that leads to a compressed air supply of the vehicle. The primary connection can preferably be oriented essentially in the axial direction, in particular with a maximum deviation of 10°, preferably a maximum of 5°. The secondary connection can be designed to be connectable to a compressed air line that is connected to a tire. The air ducting system can comprise an external thread in the area of the secondary connection. The external thread can be configured to enable or secure a connection of the compressed air line. The secondary connection can be oriented essentially in the axial direction, in particular with a deviation of maximum 10°, preferably maximum 5°, particularly preferably maximum 2° and particularly strongly preferably maximum 1°. Orientation in the axial direction can make it easier to protect the secondary connection, for example by positioning it inside the hub cap. Alternatively, the secondary connection can be oriented essentially in the radial direction, in particular with a deviation of maximum 10°, preferably maximum 5°, particularly preferably maximum 2° and particularly strongly preferred maximum 1°. An orientation in the radial direction can geometrically favor or simplify a connection to a tire. By providing an air guiding system that extends partially into or through the central aperture, the air guiding system can be protected particularly effectively—at least partially-against damage, especially during transportation.

Advantageously, the air guiding system is reversibly connected to the hub cap. "Reversibly connected to the hub cap" can mean in particular that the air guiding system can be removed from the hub cap and/or replaced. This can enable flexible replacement of the air guiding system, with the advantage that maintenance in particular can be facilitated.

Advantageously, the air guiding system can be positively fixed to the hub cap, in particular reversibly. A form-fit fixing of the air guiding system to the hub cap is a particularly efficient way of fastening. Advantageously, this positive locking can be achieved by means of a clip or a latch.

Advantageously, the air guiding system and/or the hub cap can comprise an undercut, in particular an inner or outer undercut, running at least in sections around the axial direction, and/or the hub cap and/or the air guiding system can comprise at least one latching finger, in particular for engaging in the undercut, wherein the air guiding system is fixed and/or can be fixed to the hub cap by means of the undercut and/or the at least one latching finger. The at least one latching finger can be elastically bendable back, in particular in the radial direction. Preferably, several latching fingers can be provided, wherein the latching fingers are arranged in particular around a common center, wherein the latching fingers are preferably arranged at constant distances from the respective next latching finger. It may be provided that the air guiding system can be clicked onto the hub cap by means of the undercut and/or the at least one latching finger. Particularly preferably, the hub cap and/or the air guiding system can comprise four latching fingers, wherein the four latching fingers are arranged in particular around a central point, in particular in a circle, and preferably at equal intervals. The central point can in particular be the center of the hub cap and/or the center of the central aperture. The hub cap and/or the air guiding system may comprise a circular, in particular substantially flat, element into or onto which the latching fingers can engage and/or which comprises the undercut. With at least one latching finger and/or with an undercut, a particularly efficient and uncomplicated type of fastening for assembly can be ach.

Advantageously, the air guiding system and/or the hub cap can be designed in such a way that the air guiding system is held in a rotationally fixed, in particular form-fitting, manner relative to the hub cap. Non-rotational can mean in particular that the air guiding system and the hub cap cannot rotate relative to each other and/or are essentially non-rotatable. In particular, the outside of the hub cap can be shaped in such a way that rotation of the air guiding system relative to the hub cap is prevented. "Essentially non-rotatable" can mean in particular that a slight rotation is still possible, in particular due to design restrictions. Preferably, a slight rotation means a rotation of less than 5°, particularly preferably of less than 3°, particularly preferably of less than 1°. In particular, it may be provided that the air guiding system and the hub cap are designed in such a way that the air guiding system and the hub cap rotate equally with the wheels of the vehicle when the vehicle is moving. Advantageously, this allows the positioning of the air guiding system and/or the line from the air guiding system to the tires to be constant in relation to the hub cap and/or the entire tire.

Advantageously, the air guiding system and/or the hub cap can be designed such that the air guiding system can be fixed to the hub cap only in a single predetermined position, in particular rotational position advantageously about the axial direction, or the air guiding system and/or the hub cap can be designed such that the air guiding system can be fixed to the hub cap only in a fixed number of several predetermined positions, in particular rotational positions about the axial direction. By allowing the air guiding system to be fastened in only one position relative to the hub cap, it can be ensured that a previously defined optimum relative position of the air guiding system to the hub cap is maintained during installation of the air guiding system. Advantageously, this can in particular prevent important elements of the hub cap and/or the tire, for example information texts, logos, brands and/or important connections, from being covered by the air guiding system or by air lines connected to the air guiding system. By providing several predetermined positions, this advantage can be combined with the fact that a certain flexibility is still given when installing the air guiding system. Preferably, the air guiding system can be attached to the hub cap in four predetermined positions, in particular rotational positions. The predetermined rotational positions, in particular the four rotational positions, can in particular have uniform angular distances from one another. For example, fixing in the 0°, 90°, 180° and 270° positions can be provided. A flexible positioning option of four positions can be particularly advantageous in order to be able to combine different models of hub caps and/or air guiding systems with each other as sensibly and efficiently as possible, in that a different positioning can be selected during installation depending on the model. Preferably, the air guiding system can comprise a square, in particular an essentially square-headed, square. The square can be designed to be inserted into the hub cap from the outside.

Advantageously, the predetermined positions can each still have a backlash for the positioning of the air guiding system, whereby the backlash in particular allows a rotation, especially of up to 15°, preferably of up to 5°, particularly preferably of up to 3° and particularly strongly preferably of up to 1°, of the air guiding system about an axis of rotation parallel to the axial direction. A certain amount of backlash in the positioning can advantageously enable adaptation to individual circumstances. A possible rotation of up to 15° can enable particularly good adaptation of the air guiding system. A possible rotation of up to 5° allows, for example, unforeseen obstacles to be avoided in the 0° position, while at the same time ensuring that there is no excessive deviation from the position defined as optimal. A rotatability of up to 3° represents a very precise setting on the one hand and at the same time still allows minor deviations from different components, for example from different series, to be adjusted. A rotation of up to 1° makes it possible to maintain a very precisely defined rotational position, while the slight backlash of 1° makes installation even easier, for example due to less friction, compared to a design without backlash.

Advantageously, for fixing the air guiding system to the hub cap, the air guiding system may comprise at least one, preferably several, latching fingers and/or the hub cap may comprise at least one, preferably several, latching positions for the latching fingers, and/or for fixing the air guiding system to the hub cap, the hub cap may comprise at least one, preferably several, latching fingers and/or the air guiding system may comprise at least one, preferably several, latching positions for the latching fingers. In particular, the latching fingers and the latching positions can be arranged in such a way that the air guiding system can only be attached to the hub cap in a single predetermined position, in particular a rotational position, or the latching fingers and the latching positions can be arranged in such a way that the air guiding system can only be attached to the hub cap in a fixed set of several predetermined positions, in particular rotational positions about the axial direction. The engagement positions can, for example, be bores and/or recesses, with the bores and/or recesses being designed in particular in such a way that one end of the engagement fingers just fits through these bores and/or can engage in the recesses. Advantageously, this latching position can determine that the air guiding system can only be fixed in predetermined positions in the hub cap. The latching fingers and the latching positions are expediently designed in relation to each other in such a way that they positively prevent a relative rotation of the air guiding system to the hub cap.

Advantageously, the air guiding system can have an external thread, whereby the hub cap, in particular in a central area, has an internal thread, whereby the air guiding system can be screwed and/or screwed into the internal thread of the hub cap by means of its external thread. Screwing in the air guiding system can be a particularly simple way of fastening the air guiding system to the hub cap. The external thread and/or the internal thread are expediently designed to be self-sealing, in particular as a Whitworth thread.

Alternatively, or additionally, the air guiding system and/or the hub cap may comprise, for example, a bayonet catch, whereby the air guiding system is and/or can be fastened to the hub cap by means of the bayonet catch.

Advantageously, the air guiding system can comprise an air conduit pipe for passing compressed air through the central aperture, wherein the central aperture is in particular cylindrical in shape, wherein the air guiding system is fastened and/or can be fastened to the hub cap via a fastening element on an inner wall of the central aperture and/or on the air conduit pipe. Advantageously, the fastening of the air guiding system can thus be provided within the central aperture. On the one hand, this can have the advantage that the fastening element itself is protected from external influences and, in particular, accidental detachment of the air guiding system from the hub cap is made more difficult or even impossible, while, on the other hand, this fastening element can also be prevented from visually interfering with the overall impression.

Advantageously, the air conduction tube may comprise at least one, advantageously external, latching lug and/or clip mechanism, wherein at least one configuration or recess complementary to the latching lug and/or clip mechanism is formed in the central aperture, wherein the air conduction system is attached and/or attachable to the hub cap by means of the latching lug and/or clip mechanism in conjunction with the complementary configuration or recess. Alternatively, it may also be provided that the latching lug and/or the clip mechanism is arranged in the central aperture, with the air duct tube comprising the recess complementary to the latching lug or the clip mechanism. A connection by means of the latching lug and/or the clip mechanism can enable a particularly simple installation, in which the air duct pipe in particular only has to be pushed into the central aperture.

Advantageously, the hub cap and the air guiding system can each have a groove, with the air guiding system being axially fixed and/or fixable by means of a snap ring via the two grooves. This embodiment can thus represent a relatively simple but at the same time very secure fastening option.

Advantageously, the air guiding system can have a latching mechanism, in particular in the form of an undercut or at least one latching finger, in the area of the primary connection and/or at the end of the air guide tube facing the primary connection, whereby the air guiding system can be braced and/or braced by means of the latching mechanism by bracing with an area of the hub cap around the central aperture. For example, it may be provided that the at least one latching finger, preferably several latching fingers, is/are braceable with a surface of the hub cap, which is arranged at the mouth of the central aperture. Advantageously, it may be possible, for example, to insert and advance the air guiding system into the central aperture by pressing the latching fingers or the latching mechanism together, whereby the latching mechanism engages as soon as the air guiding system has been inserted completely or far enough into the central aperture.

Advantageously, the air guiding system can be designed in such a way that it is non-round, in particular square, preferably quadrangular, in cross-section when viewed in a contact area with the hub cap and changes to a round, in particular circular, cross-section in the area of the primary connection.

Advantageously, the hub cap system may comprise an adapter element, wherein the air guiding system is reversibly connected and/or connectable to the adapter element, wherein the adapter element is reversibly connected and/or connectable to the hub cap. The connection between the air guiding system and the adapter element and/or the connection between the adapter element and the hub cap may be listed analogously and have corresponding advantages and features as the connection between the air guiding system and the hub cap described herein and vice versa. An adapter element can enable a particularly high degree of flexibility in the attachment of the air guiding system to the hub cap. In particular, it may be possible to connect air ducting systems and hubcaps that are not compatible per se by using an adapter element. According to one embodiment, the adapter element can comprise an undercut, in particular an inner or outer undercut, running around the axial direction and/or at least one latching finger, whereby the adapter element is fixed and/or can be fixed to the hub cap by means of the undercut and/or the latching finger. Alternatively, or additionally, the adapter element can have an internal thread and the air guiding system can have a matching external thread, whereby the air guiding system can be screwed and/or screwed into the adapter element.

Advantageously, the adapter element may comprise a dowel-like mechanism for bracing and/or clamping with the hub cap. The dowel-like mechanism may comprise an opening for inserting the air guiding system, in particular the dowel-like mechanism may comprise an internal thread which is designed to allow the air guiding system to be screwed into it. The dowel-like mechanism can comprise at least one, preferably several, latching fingers, which are designed in particular to be braceable with the central aperture and/or with a surface into which the central aperture opens. Alternatively, or additionally, the dowel-like mechanism may be designed such that it expands, in particular braces itself with the hub cap and/or the central aperture, when the air guiding system is introduced into the dowel-like mechanism. The dowel-like mechanism can therefore also be referred to as an expansion mechanism. In particular, the dowel-like mechanism can comprise one or more latching fingers with which the dowel-like mechanism can brace itself with the hub cap, in particular the central aperture.

Advantageously, it may be provided that the hub cap forms or can form the distal end regions of the hub cap system in the direction of the axial direction. In particular, it may be provided that the air guiding system does not protrude beyond the hub cap in the axial direction or that the hub cap protrudes further in the axial direction than the air guiding system. Advantageously, the air guiding system can be protected in this way, both during transportation of the hub cap system, in particular before installation, and during use of the hub cap system after installation.

Advantageously, the hub cap can comprise a protective element, in particular a protective plate, wherein the protective element forms one of the distal end regions of the hub cap system in the direction of the axial direction, wherein the protective element extends in the radial direction such that it covers the air guiding system in the axial direction at least in sections, wherein in particular the protective element can be arranged essentially centrally on the hub cap as viewed in a radial direction. Advantageously, the protective element can have a smaller extension in the axial direction than in the radial directions. The protective element can be connected to the rest of the hub cap by means of a force-fit and/or form-fit connection mechanism. For example, the protective element can be connected to the rest of the hub cap via a snap-in mechanism, via a bayonet catch and/or via a threaded connection, for example by screwing it in. The protective element can provide good protection for the air guiding system by completely or at least partially protecting the air guiding system, in particular the most sensitive parts of the air guiding system, in the axial direction.

Advantageously, the air guiding system can be arranged in a recess in the hub cap. Arranging the air guiding system in a recess in the hub cap can enable particularly effective protection of the air guiding system, especially in the radial direction. Preferably, it can be provided that the air guiding system does not protrude beyond the hub cap in the axial direction.

Advantageously, the recess can be continuous in at least one radial direction up to a radial end of the hub cap. If the recess is continuous in at least one radial direction up to the radial end of the hub cap, this can have the advantage that, on the one hand, the air guiding system is protected by the placement in the recess, while, on the other hand, a connection to the air guiding system, for example by a connecting hose to the tire of the vehicle, is particularly easy due to the continuous recess. In this case, the connection to the air guiding system can, for example, be routed laterally or radially away from the air guiding systems.

Advantageously, the recess can be formed at least in sections like a segment of a circle and/or in accordance with a radially outer section of a segment of a circle, the angle of the arc of the segment of a circle being in particular between 40° and 170°, preferably between 50° and 130° and particularly preferably between 60° and 100°. The circular segment-like design of the recess can in particular be designed in such a way that the recess becomes increasingly wider towards the edge of the hub cap and/or away from the air guiding system. A circular segment-like design can be advantageous because, on the one hand, the air guiding system, which is preferably located inside the circle, is better protected by the narrower recess there, while the widening recess in the outer area of the circle enables a good and simple connection to the air guiding system. An angle of the circular arc between 40° and 170° enables particularly good access to the air ducting system. A segment of the circle with an angle between 50° and 130° makes it possible to protect the air ducting system particularly well and efficiently against influences from the radial direction from the side of the air ducting system. An angle between 60° and 100° also makes it possible to use the circular segment as an engagement for a tool in the hub cap, for example to turn the hub cap if the tire valve is not in the correct position.

Advantageously, the hub cap may comprise a collar element extending in the axial direction, wherein at least a distal end portion of the collar element facing away from the central aperture in the axial direction projects beyond the air guiding system in the axial direction, wherein the collar element in particular surrounds or encloses at least a part of the air guiding system and/or the central aperture at least in sections in a radial direction. In other words, it may be provided that the collar element forms the distal end section of the complete hub cap system in the axial direction and can thereby in particular protect the air guiding system from external influences. By "fencing in" it can be understood that the collar element surrounds or at least partially surrounds the air guiding system and/or the central aperture in the radial direction. In other words, the collar element can be arranged in such a way that it is arranged further outwards in the radial direction than the air guiding system, at least in sections. Advantageously, the collar element can protect the air guiding system both in the axial direction and in the radial direction; in particular, the collar element can prevent the air guiding system from breaking off or being damaged by impacts running in the radial direction.

Advantageously, the collar element can have a variable extension in the axial direction comprising at least one, at least local, minimum extension, with the secondary connection of the air guiding system being arranged in the area of the minimum extension. In particular, the collar element can extend less in the area of the minimum extension in the axial direction than the air guiding system. Advantageously, this allows a connection to the secondary connection of the air guiding system from the radial direction.

Advantageously, the secondary connection can protrude beyond the collar element in the radial direction and/or be arranged beyond the minimum extension of the collar element in the axial direction. With such an embodiment, the air guiding system can be completely protected in essential parts by the collar element and at the same time a simple connection to the secondary connection of the air guiding system can be possible.

Advantageously, the air guiding system can be displaceable and/or extendable in the axial direction, in particular translationally. In particular, the air guiding system can be displaceable and/or extendable relative to the hub cap.

For example, the hub cap system can be secured on the one hand for transportation before installation and, on the other hand, protrude slightly further beyond the hub cap by displacement or extraction for use after installation. According to a preferred embodiment, the air guiding system can be transferred from a first position to a second position, wherein in particular the air guiding system in the second position projects beyond the hub cap when viewed in the axial direction, wherein in particular the air guiding system in the first position does not project beyond the hub cap when viewed in the axial direction. In particular, the first position may be intended for transportation of the air guiding system, while the second position is intended for use after installation of the air guiding system. The air guiding system can be designed in such a way that it does not protrude beyond the hub cap of the hub cap system in the first position. Alternatively, or additionally, the air guiding system can be designed in such a way that in the second position it protrudes beyond the hub cap in the axial direction, in particular with its secondary connection. This makes it particularly advantageous to switch efficiently between a transport position and an operating position of the air guiding system. Advantageously, the air guiding system is in an assembled state in relation to the hub cap in all of these positions.

Advantageously, the hub cap system can comprise at least one fixing element for fixing the air guiding system in the second and/or the first position, in particular in a form-fitting manner, by means of a contact section of the fixing element. According to one embodiment, the hub cap system can comprise at least one hook element for fixing the air guiding system in the second and/or the first position by means of a contact section of the hook element, wherein the contact section can be displaced in particular in a radial direction extending transversely to the axial direction for releasing the air guiding system. Alternatively, or additionally, the hub cap system, in particular as part of the hub cap and/or the air guiding system, can comprise at least one latching lug for fixing the air guiding system in the second and/or first position. A fixing element can advantageously prevent the air supply system from being inadvertently displaced and/or pulled out. Preferably, the fixing element, in particular the hook element, can comprise a spring mechanism for pre-tensioning the fixing element, in particular the hook element, in a position in which the air supply system is fixed by the fixing element, in particular the hook element.

Advantageously, the air guiding system can comprise a telescopic mechanism, in particular for retracting and extending the air guiding system. A telescopic mechanism can be a particularly simple way of moving the air guiding system. In particular, the air guiding system can comprise at least a first cylindrical body and a second cylindrical body, wherein the orientation of the axis of both cylinders essentially corresponds or can correspond to the axial direction, wherein the second cylindrical body can have a smaller diameter than the first cylindrical body and/or can be arranged concentrically and at least partially overlapping with the first cylindrical body, wherein the first and second cylindrical bodies can be displaceable relative to one another in the axial direction for the purpose of extending the rotary union.

Advantageously, the hub cap system can comprise a bellows device, in particular for retracting and extending and/or displacing the air guiding system in the axial direction. In particular, it may be provided that the bellows device is arranged in such a way that, when the bellows device is extended, the air guiding system is arranged completely inside the hub cap and/or that, when the bellows device is fully contracted, the air guiding system protrudes beyond the hub cap and/or is displaced further outwards in the axial direction. In particular, it may be provided that the air guiding system is arranged at least partially within the bellows device, in particular when the bellows device is extended. Advantageously, the bellows device can thus on the one hand enable the air guiding system to be displaced and on the other hand protect the air guiding system from external influences.

Advantageously, the hub cap can have a central body and a mounting body, wherein the mounting body serves to fix the hub cap to a wheel or a hub, in particular by means of fastening means, wherein the central body forms the central aperture and/or wherein the central body is fixed in or on a mounting opening of the mounting body. The attachment of the central body to the mounting body can basically be designed in the same way as the attachment of the air guiding system to the hub cap described here. Alternatively, the attachment between the mounting body and the central body can also be designed differently. Advantageously, both the central body and the mounting body can be combined in this way as modular parts depending on the requirements of the central body and the mounting body. Advantageously, the mounting body and the central body can be fixed and/or secured to each other by means of a, in particular circumferential, latching lug and a complementary, in particular circumferential, recess.

A further aspect is a vehicle, in particular a commercial vehicle, comprising a hub cap system, a sealing ring and/or a hub cap system as described above and below. All advantages, embodiments and features of the hub cap system, the sealing ring and the hub cap system can be transferred analogously to the vehicle and vice versa.

A further aspect is also directed to a method of manufacturing and/or assembling a hub cap system comprising a hub cap and an air ducting system for a tire pressure regulation system, comprising the steps of displacement, in particular translational displacement relative to the hub cap, of the air guiding system in the axial direction into a first position, so that the air guiding system does not protrude beyond the hub cap when viewed in the axial direction of the hub cap;

relocation or provision of the hub cap system;

installation of the hub cap system in and/or on a vehicle, in particular a commercial vehicle, and/or in a wheel of a vehicle, in particular a commercial vehicle;

displacement, in particular translational displacement relative to the hub cap, of the air guiding system in the axial direction into a second position, so that the air guiding system projects beyond the hub cap on at least one side when viewed in the axial direction of the hub cap.

Advantageously, the air guiding system is mounted and/or attached and/or fixed to the hub cap both in the first position and in the second position. Mounted and/or fixed can be understood to mean that forces and/or torques can be transmitted directly or indirectly between the hub cap and the air guiding system. All advantages and features of the hub cap system and the vehicle can be transferred analogously to the method and vice versa.

A further aspect is a hub cap system, in particular a hub cap system as described above and below, comprising a sealing ring, in particular as described below.

A further aspect is a sealing ring comprising a retaining region, a primary sealing lip and a secondary sealing lip, wherein the retaining region is formed circumferentially about an axial direction, wherein a radial direction extends radially and perpendicularly away from the axial direction, wherein the primary sealing lip and the secondary sealing lip have an extension in the radial direction, in particular in the positive radial direction. The axial direction refers in particular to a direction perpendicular to the surface spanned by the sealing ring. The axial direction or the central axis preferably runs through the center of the sealing ring. The radial direction runs in particular from the center point or the center axis of the sealing ring radially outwards and/or perpendicular to the axial direction. A positive radial direction can be understood as a direction that runs radially outwards from the center point or the center axis of the sealing ring, while a negative radial direction can be understood as a direction that points radially from the outside to the center point or the center axis of the sealing ring. The sealing ring can have an essentially constant cross-section and/or a predominantly or sectionally constant cross-section, in particular in a direction transverse to the axial direction and transverse to the radial direction. In this context, essentially constant means in particular that the sealing ring has a constant cross-section apart from design-related deviations. Predominantly or sectionally constant can mean that the sealing ring has an essentially constant cross-section, but deviates from this constant cross-section in places, e.g. due to at least one opening. Advantageously, the sealing ring can be formed in one piece. A one-piece design can enable a particularly secure sealing effect and, if necessary, prevent assembly errors due to incorrect assembly. For example, the sealing ring can be elastically fitted at the location of its intended use. The sealing ring has a retaining area, whereby the retaining area in particular comprises a contact area of the sealing ring, e.g. on a hub cap and/or on a wheel hub, and/or is designed for contact with e.g. a hub cap and/or on a wheel hub. The retaining area can be a base body, which makes up the majority of the mass and/or volume of the sealing ring. The retaining area may have an approximately rectangular cross-section, and/or wherein, for example, the corners of the retaining area may be rounded and/or wherein the retaining area may deviate from the rectangular cross-sectional shape on a side on which the primary sealing lip and/or the secondary sealing lip is/are arranged or formed and/or adjoin the retaining area. The retaining area and/or the sealing ring can comprise recesses, indentations and/or openings or through-holes, which can serve in particular to guide and/or retain air. The retaining area is arranged circumferentially around an axial direction and/or around a central axis of the sealing ring. The primary sealing lip and/or the secondary sealing lip can connect to the retaining area. Alternatively, the primary sealing lip and/or the secondary sealing lip can be spaced apart from the retaining area. For example, a transition area can be provided between the holding area and the primary sealing lip and/or the secondary sealing lip. The primary sealing lip and/or the secondary sealing lip can preferably be elastic. Advantageously, the retaining area, the secondary sealing lip and/or the primary sealing lip are made of the same material. Advantageously, the retaining area is materially connected to the primary sealing lip and/or the secondary sealing lip, whereby a particularly high mechanical load-bearing capacity and sealing effect can be achieved as a result. A specified extension of the primary sealing lip and the secondary sealing lip can refer in particular to a relaxed, i.e. in particular non-elastically deformed state of the sealing lips. An extension of the primary sealing lip and/or the secondary sealing lip refers in particular to an extension along the main extension or the longest extension of the respective sealing lip. The primary sealing lip and/or the secondary sealing lip can extend proportionally in a further direction in addition to the radial direction, e.g. in the axial direction. The extension of the primary sealing lip and/or the secondary sealing lip therefore has at least one component in the radial direction. Optionally, the extension of the primary sealing lip and/or the secondary sealing lip can have a further component in a different direction. For example, the primary sealing lip and/or the secondary sealing lip can extend at an angle to the radial direction. One direction of the extension of the primary sealing lip and/or the secondary sealing lip is measured in particular from its attachment to the other components of the sealing ring, in particular the retaining area, to its distal end. An extension in the positive direction can mean that the primary sealing lip and/or the secondary sealing lip extends radially outwards from its attachment to the sealing ring away from the center of the sealing ring or the axial direction or the center axis of the sealing ring. In particular, a distal end of the primary sealing lip and/or the secondary sealing lip can be further away from the center of the sealing ring or the axial direction than the base of the primary sealing lip and/or the secondary sealing lip. The primary sealing lip may represent the distal end of the sealing ring in a first direction, in particular in the radial direction, and/or the secondary sealing lip may represent the end of the sealing ring in a second direction, in particular in a direction substantially perpendicular to the first direction, preferably parallel to the axial direction, and/or extend to the end of the sealing ring in the second direction. For example, the primary sealing lip can be designed to prevent the ingress of foreign bodies, in particular dirt and/or water, into an interior space, e.g. of a wheel hub and/or a wheel. The secondary sealing lip can be designed to prevent the penetration of foreign bodies, in particular dirt and/or water, into the interior, in particular at a pressure in the interior that is below a predetermined threshold pressure. In addition, the secondary sealing lip can be designed to allow pressure to be released by flexibly bending it back when there is excess pressure in the interior above the predetermined threshold pressure. The bending back of the secondary sealing lip can be caused in particular by the pressure in the interior. In other words, the secondary sealing lip can be designed to create a seal at normal pressure and enable overpressure compensation by flexibly bending back when a pressure threshold value is exceeded. The sealing effect of the primary sealing lip and/or the secondary sealing lip can be achieved in particular by the primary sealing lip and/or the secondary sealing lip bearing against a surface, e.g. a hub cap and/or a wheel hub. Advantageously, the sealing ring according to the invention can be used, for example, on the one hand to prevent the ingress of dirt and/or water, in particular through the primary sealing lip, and on the other hand, if necessary, to enable venting of excess pressure, e.g. leakage pressure, from an interior space, in particular through the secondary sealing lip. All the advantages and features of the hub cap system, the vehicle and the method can be transferred analogously to the sealing ring and vice versa.

Advantageously, the primary sealing lip and/or the secondary sealing lip can extend from the retaining area. In other words, the primary sealing lip and/or the secondary sealing lip can connect directly to the retaining area. This can result in a particularly simple and compact design of the sealing ring.

Advantageously, the primary sealing lip and/or the secondary sealing lip and/or the retaining area and/or the sealing ring can be made of rubber and/or a plastic, in particular to a predominant extent. Advantageously, the sealing ring can be made entirely of rubber and/or plastic. A predominant part can mean here that the sealing ring comprises, for example, a protective layer, in particular an outer protective layer, and/or an inclusion and/or an outer additive made of another material. Alternatively, or additionally, the sealing ring may comprise an admixture of another material. To a predominant extent can mean in particular that the sealing ring is made of more than 50 percent, preferably more than 80 percent, rubber and/or a plastic. If other materials are added so that the sealing ring consists of more than 50 percent rubber and/or plastic, the sealing ring can have particularly good stability and/or particularly good protection against environmental influences. A design consisting of more than 80 percent rubber and/or a plastic can enable particularly good elasticity and/or tightness of the sealing ring. Furthermore, a complete rubber and/or plastic design can enable relatively inexpensive and/or simple manufacture.

Advantageously, a receiving space can be provided between the secondary sealing lip and the retaining area, whereby the receiving space is designed in particular to be rotationally symmetrical around the axial direction. The receiving space can preferably be a recess or a recess, in particular on a side of the sealing ring whose normal runs in the axial direction. Together with the secondary sealing lip and with a surface against which the secondary sealing lip rests in the installed state or against which the secondary sealing lip rests at normal pressure, the recess or recess can be designed to form an outwardly sealed space, whereby the space can have a connection to an interior space sealed by the sealing ring. The receiving space or the recess or the recess can have a round, in particular semi-circular, cross-sectional profile in a direction transverse to the axial direction and transverse to the radial direction. In particular, the receiving space can adjoin the extension of the secondary sealing lip at least in sections, preferably completely. The volume of the receiving space can be used in particular to ensure that the pressure acts on the secondary sealing lip as evenly as possible, especially when viewed in the direction of rotation of the sealing ring. Additionally or alternatively, it can be made possible for the pressure to act on the entire extent of the secondary sealing lip or at least on a large part of the extent of the secondary sealing lip. Advantageously, the receiving space can in particular enable a particularly reliable pressure equalization function of the secondary sealing lip. A particularly rotationally symmetrical design around the sealing ring can also make it particularly easy to manufacture.

Advantageously, the primary sealing lip can project beyond the secondary sealing lip in the radial direction. Advantageously, the secondary sealing lip can thus create a seal radially on the outside or at a distal end in the positive radial direction. For example, the sealing ring can be used for a hub cap, which has a mounting area and/or engaging elements extending in the axial direction for engaging in a wheel hub, in that the sealing ring is arranged in the radial direction between an outer part of the wheel hub and the mounting area or the engaging elements. This allows the primary sealing lip to seal an inner space of the wheel hub or wheel due to its radial position. The secondary sealing lip, on the other hand, can assume the function of a pressure release valve by means of an elastic design.

Advantageously, the primary sealing lip and/or the secondary sealing lip can extend in the axial direction and in the radial direction. In other words, the primary sealing lip and/or the secondary sealing lip may extend obliquely to the axial direction and to the radial direction. This type of extension can enable the primary sealing lip to make particularly good sealing contact with a surface, e.g. a wheel hub. Due to this type of extension, the secondary sealing lip can be used particularly well for releasing excess pressure, especially if it is in contact with a surface whose normal runs parallel to the axial direction, whereby it can be in sealing contact with the surface below a predetermined pressure value. Advantageously, the primary sealing lip and/or the secondary sealing lip can extend essentially equally in the axial direction and in the radial direction, whereby "essentially" can mean a deviation of a maximum of 10 percent from a similar extension in these two directions. It has been found that such a uniform design can achieve a particularly good sealing effect on the one hand and, on the other hand, an opening of a venting path can be achieved by elastic bending of the secondary sealing lip with only slight bending, in particular less than with a non-oblique alignment.

Advantageously, it can be provided that the primary sealing lip and the secondary sealing lip are designed to extend in the same direction. In other words, the main directions of extension of the primary sealing lip and the secondary sealing lip can be aligned parallel to each other. This can represent a particularly simple and at the same time effective embodiment for sealing.

Advantageously, the retaining area can have a bottom surface, whereby the bottom surface is preferably coaxial to the axial direction and/or preferably faces the central axis of the sealing ring, whereby a channel running around the axial direction can advantageously be formed in the bottom surface. The channel can preferably be semi-circular in cross-section and/or have a cross-section that is essentially constant along its course. The bottom surface can be formed or arranged opposite the side of the sealing ring or the retaining area to which the primary sealing lip adjoins and/or to which the secondary sealing lip adjoins. The channel can advantageously facilitate the assembly of the sealing ring and/or increase the sealing effect of the sealing ring. In particular, the channel can be designed to be in fluid contact with an interior space to be sealed by the sealing ring. Advantageously, the air can be guided in the channel and, in particular, directed from the channel to the secondary sealing lip. The channel can thus enable particularly uniform and reliable venting.

Advantageously, the sealing ring can have an aperture. In particular, the aperture can be designed to provide a venting path or an air path from an interior sealed by the sealing ring to the secondary sealing lip. The aperture can be cylindrical in shape. The sealing ring can preferably have several apertures, whereby the apertures are distributed evenly around the sealing ring. Advantageously, the aperture can serve to connect a sealed inner space with the secondary sealing lip and/or an area next to the secondary sealing lip.

Advantageously, the aperture can open into the floor surface and/or the duct. The aperture can thus be used, particularly in conjunction with the duct, to direct the air in a targeted manner, especially to provide a venting path in the event of excess pressure in the sealed interior.

Advantageously, the aperture can open into the receiving space. The aperture can enable a fluid connection from the interior to the receiving chamber. In this case, the receiving space can advantageously enable an even distribution of any pressurized air. In the event of overpressure, the secondary sealing lip can be automatically bent back elastically to release a venting path, whereby the release can be reliably adjusted, in particular due to the even distribution by means of the receiving space. The aperture designed in this way can therefore provide a venting path through the sealing ring itself. Since it is preferably only a single aperture or only a few apertures, the stability of the sealing ring in particular is not impaired too much.

Advantageously, the aperture can extend in the axial direction and/or in the radial direction. An extension in the axial direction and in the radial direction can advantageously make it possible, for example, for air to be conducted from an area of the sealed inner chamber that is further inside when viewed in the axial direction and/or in the radial direction to an outer area of the sealing ring when viewed in the axial direction and in the radial direction. Furthermore, the transmission of pressure surges from the interior directly to the secondary sealing lip can be prevented, which can enable a more even pressure regulation of the interior.

Advantageously, the primary sealing lip and/or the secondary sealing lip can be designed to extend completely around the axial direction. In particular, a cross-section transverse to the axial direction and the radial direction of the primary sealing lip and/or the secondary sealing lip can be designed to be constant. A design that runs completely around the axial direction can enable simple production. In addition, the sealing ring or the primary sealing lip and/or the secondary sealing lip can thus be particularly mechanically resilient. Furthermore, by running all the way around, a uniform release of overpressure can be realized.

According to a further aspect, a hub cap system, in particular a hub cap system as described herein, is provided for attachment to a wheel hub of a vehicle, in particular a commercial vehicle, comprising a hub cap and a sealing ring as described herein. A commercial vehicle within the meaning of the invention is in particular a vehicle which has a permissible total weight of more than 3.5 tons, preferably more than 7.5 tons and particularly preferably more than 18 tons. The commercial vehicle can in particular be a road-worthy and/or a road-bound vehicle. Preferably, such a commercial vehicle can be a trailer, in particular a semitrailer. All the advantages and features of the sealing ring can be transferred analogously to the hub cap system and vice versa. The sealing ring according to the invention can be used for venting an inner space of the wheel hub or a wheel in the event of overpressure, in particular by means of the secondary sealing lip, whereby the sealing ring simultaneously provides protection of the inner space against dirt and/or water or other liquids, in particular with the aid of the primary sealing lip and/or the secondary sealing lip.

Advantageously, the hub cap can have a fastening area, in particular a groove, wherein the fastening area is advantageously circumferential around the axial direction or central axis of the sealing ring, and/or wherein optionally the fastening area is advantageously designed pointing away from the axial direction or a central axis of the sealing ring, and wherein the sealing ring, in particular the retaining area of the sealing ring, is arranged on or in the fastening area. Pointing away from the axial direction can mean in particular that the fastening area is arranged on a side of the hub cap facing in the positive radial direction. The fastening area, in particular the groove, can advantageously serve to stabilize the arrangement of the sealing ring or ensure or facilitate the correct arrangement of the sealing ring during installation.

Advantageously, the hub cap can have or at least partially enclose an interior space, whereby the hub cap has at least one connecting aperture, whereby the connecting aperture connects the aperture, the channel or the receiving space with the interior space. In particular, the connecting aperture can be designed as an air passage. Advantageously, a venting path can thus be provided by the connecting aperture, which is released into the interior when the secondary lip is bent back elastically in the event of overpressure. In the event of overpressure, the air can flow specifically through this venting path, i.e. through the connecting aperture and—if present-optionally through the aperture, the channel and/or the receiving chamber, thus ensuring venting in the event of overpressure. If there is no overpressure or if a pressure threshold value is not exceeded, i.e. in particular if venting is not necessary, the secondary protective lip ensures that the interior is protected.

Conveniently, the secondary sealing lip can rest against the hub cap or be placed against it. This is therefore a simple way in which the secondary sealing lip can protect the interior when in place. In particular, the secondary sealing lip can be designed to release a venting path to reduce the pressure in the interior by elastically bending away from the hub cap when a predetermined pressure value is exceeded in the interior and to block the venting path by bearing against the hub cap below the predetermined pressure value. Preferably, the secondary sealing lip can rest against a surface of the hub cap, whereby the normal of the surface is aligned essentially parallel to the axial direction, whereby a deviation from a parallel alignment, in particular of a maximum of 10°, preferably of a maximum of 5°, can be understood as essentially parallel. This represents a particularly efficient way of regulating the pressure in the interior, in particular utilizing the geometric conditions of the arrangement between the hub cap and the sealing ring. Advantageously, the secondary sealing lip can be oriented in such a way that a point of contact of the secondary sealing lip with the hub cap is further away from the center of the hub cap and/or radially further outwards than an attachment of the secondary sealing lip to the sealing ring and/or to the retaining area of the sealing ring when viewed in the radial direction. In particular, this can cause the secondary sealing lip to run at an angle, which can be particularly favorable for sealing and/or clearing a venting path.

Advantageously, the sealing ring and/or the hub cap can be designed such that the pressure applied on one side of the secondary sealing lip, in particular the side facing the axial direction, essentially corresponds to the pressure in the interior of the hub cap. In other words, fluid can flow from one side of the secondary sealing lip to the interior of the hub cap without the fluid having to leave the hub cap or the sealing ring. The pressure acting on the secondary sealing lip can thus correspond to the pressure in the interior, which makes it possible to directly couple the behavior, in particular opening and closing, of the secondary sealing lip to the pressure in the interior.

Advantageously, the hub cap can have fastening means, in particular fastening fingers, for fixing the hub cap to a wheel hub. Preferably, the sealing ring and/or the fastening area can be arranged in the area of a connection of the fastening means to the hub cap. This makes it particularly easy to jam the sealing ring and thus achieve a seal through the sealing ring.

According to a further aspect of the invention, a hub cap system comprising a wheel hub and a hub cap system as described herein is provided, wherein the primary sealing lip abuts or can be applied to the wheel hub. All advantages and features of the sealing ring, the hub cap system, the vehicle and the method can be transferred analogously to the hub cap system and vice versa.

BRIEF DESCRIPTION OF THE DRAWINGS

Individual features and embodiments mentioned above can be combined with each other and the advantages assigned to the individual features also apply to a combination of these features. Further advantages and features of the invention are apparent from the following description of preferred embodiments of the object according to the invention with reference to the accompanying figures. The following description serves only to clarify the invention and should not be understood as limiting the appended claims to one of the embodiments. It shows

DETAILED DESCRIPTION OF THE PREFERRED EMBODIMENTS

Figure 1:
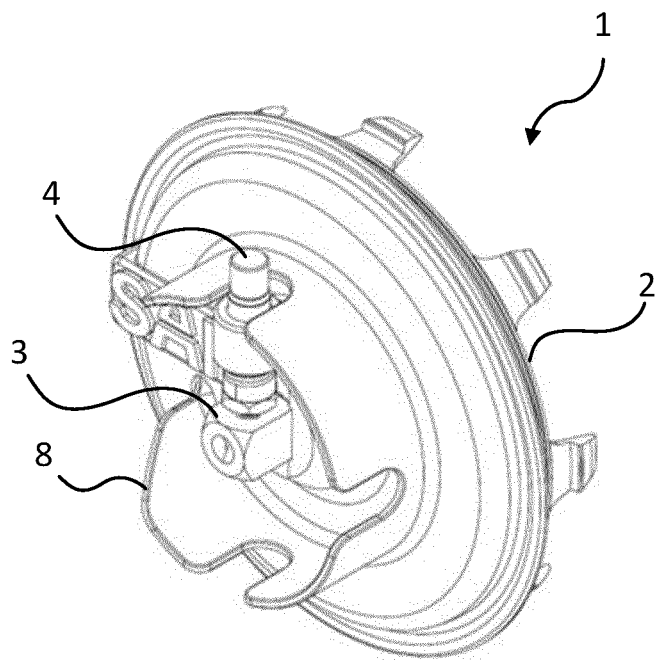
FIG. 1 is a perspective view of a hub cap system according to one embodiment of the invention.

FIG. 1 shows a hub cap system 1. The hub cap system 1 comprises a hub cap 2 and an air ducting system 3, whereby the air ducting system 3 is in particular a rotary union. FIG. 1 shows a secondary connection 4 of the air guiding system 3, which is provided in particular for connecting a compressed air line leading to a tire. Furthermore, the hub cap system 1 comprises a collar element 8, which surrounds the air guiding system 3 in sections. The collar element 8 serves to protect the air guiding system 3. The collar element 8 has a variable extension, whereby the secondary connection 4 of the air guiding system 3 is arranged in a local minimum of the extension of the collar element 8.

Figure 2:
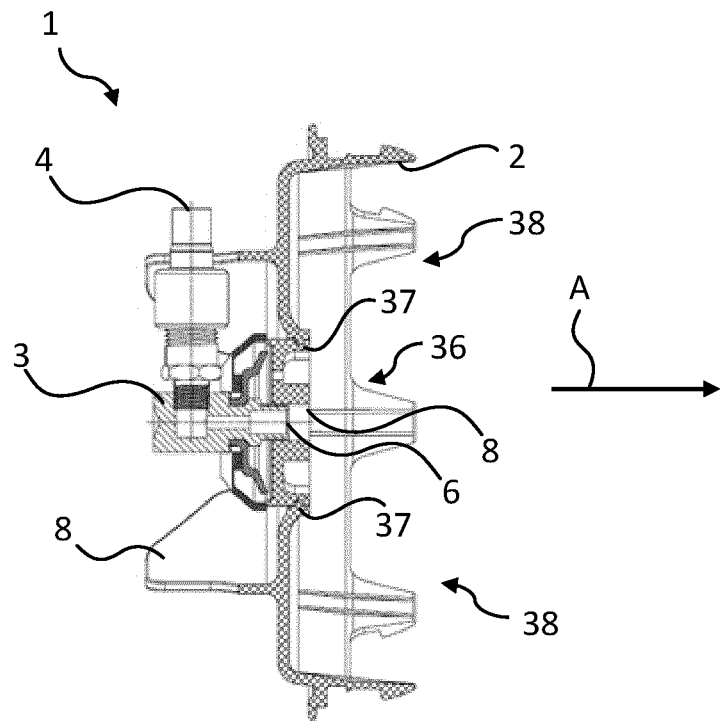
FIG. 2 is a sectional view of the hub cap system according to the embodiment of the invention shown in FIG. 1.

FIG. 2 shows a sectional view of a hub cap system 1, which could also be shown in FIG. 1. The collar element 8 projects slightly beyond the air guiding system 3 in the axial direction and thus forms a protection for the air guiding system 3. A primary connection 8 of the air guiding system 3 is arranged within a central aperture 32 of the hub cap 2. The hub cap 2 comprises a mounting body 38 for connection to a wheel hub and a central body 36. The mounting body 38 and the central body 36 are fixed to each other by means of a fastening means 37, which is a latching lug of the mounting body 38. The fastening means 37 of the mounting body 38 engages in a recess in the central body 36. Both the fastening means 37 and the recess are circumferential. The central body 36 also comprises the central aperture 32, in which the air guiding system 3 is partially arranged.

Figure 3:
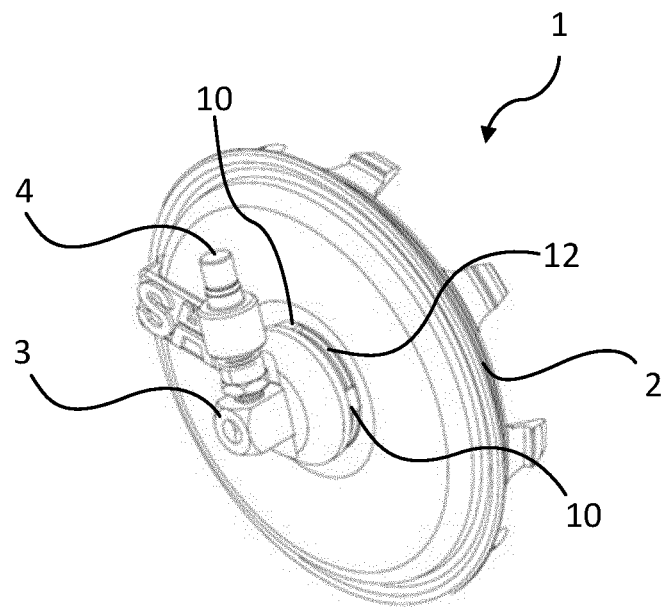
FIG. 3 is a perspective view of a hub cap system according to a further embodiment of the invention.
Figure 4:
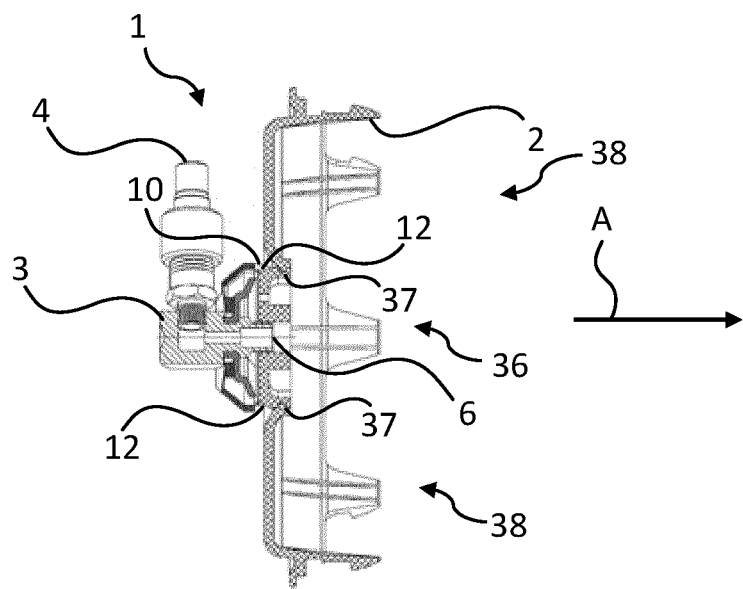
FIG. 4 is a sectional view of the hub cap system according to the embodiment of the invention shown in FIG. 2.

FIGS. 3 and 4 show a hub cap system 1 according to a further embodiment of the invention. The hub cap system 1 does not have a collar element 8. However, it is also optionally possible for a collar element 8 to be provided in this embodiment—as well as in all other embodiments shown. The hub cap system 1 comprises several latching fingers 10, in particular four latching fingers 10, which are part of the air guiding system 3 and which engage in a corresponding undercut of the hub cap 2. A corresponding fastening can also be provided in the embodiment shown in FIG. 1. The other features of this embodiment essentially correspond to the embodiment shown in FIGS. 1 and 2.

Figure 5:
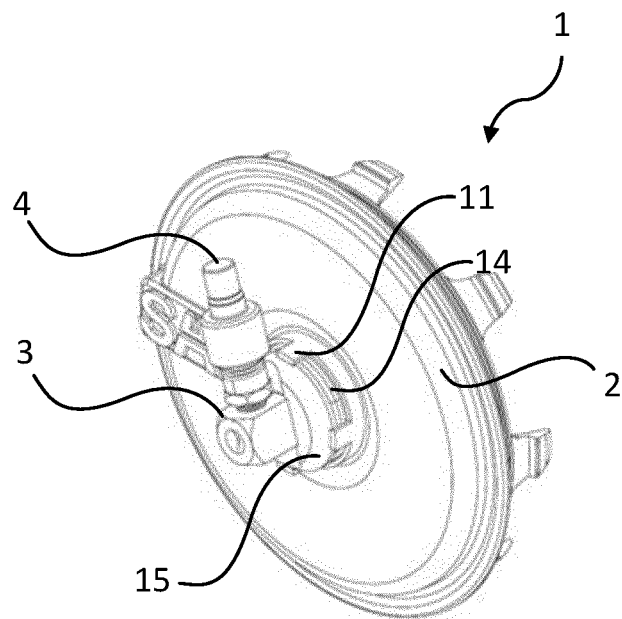
FIG. 5 is a perspective view of a hub cap system according to a further embodiment of the invention.
Figure 6:
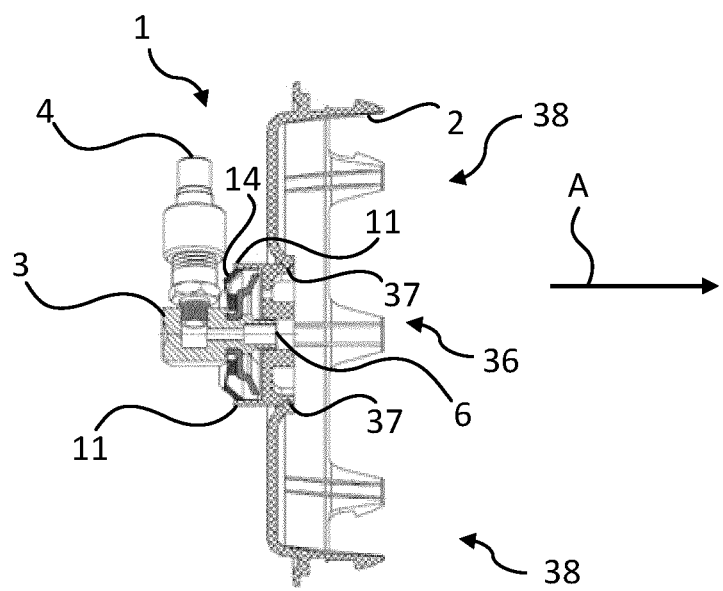
FIG. 6 is a sectional view of the hub cap system according to the embodiment of the invention shown in FIG. 5.

FIGS. 5 and 6 show a hub cap system 1 in which the air guiding system 3 is attached to the hub cap 2 by means of an adapter element 14. The adapter element 14 is fixed to the hub cap 2 by means of latching fingers 11 of the hub cap 2. The latching fingers 11 of the hub cap 2 fix the adapter element 14 by engaging around the adapter element 14 and fixing the adapter element 14 by bracing it with a surface 15 of the adapter element. In this embodiment, the air guiding system 3 is screwed into the adapter element 14. However, it is also possible, for example, for the air guiding system 3 to be clamped into the adapter element 14 or to be fixed in the adapter element 14, for example by means of a latching lug.

Figure 7:
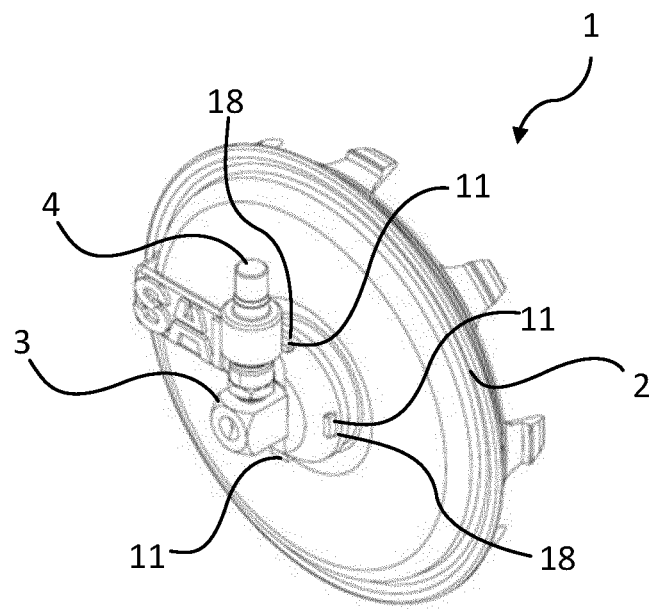
FIG. 7 is a perspective view of a hub cap system according to a further embodiment of the invention.

FIG. 7 shows a hub cap system 1, wherein the air guiding system 3 has several engagement positions 18, e.g. four engagement positions 18, which are evenly distributed radially on the air guiding system 3. The engagement positions 18 consist of openings in the air guiding system 3 extending in the axial direction A. Several latching fingers 11 of the hub cap 2 engage in these engagement positions 18 in order to fix the air guiding system 3 in position. By providing four symmetrically arranged engagement positions 18, there are exactly four positions or four rotational positions in which the air guiding system 3 can be fixed to the hub cap 2.

Figure 8:
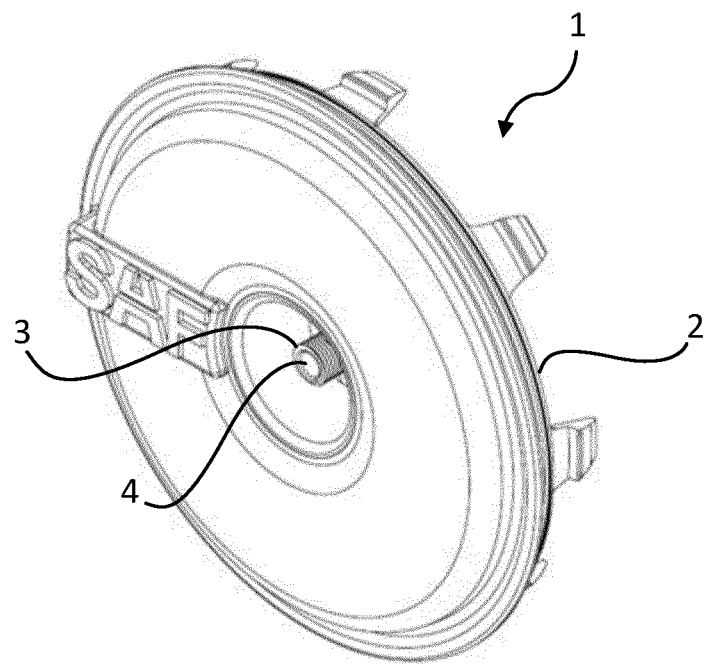
FIG. 8 is a perspective view of a hub cap system according to a further embodiment of the invention.

FIG. 8 shows a hub cap system 1, whereby the air guiding system 3 is arranged in a recess in the hub cap 2 so that the air guiding system 3 does not protrude beyond the hub cap 2 in axial direction A. The secondary connection 4 is aligned in axial direction A, so that a connection to the secondary connection 4 can be made in axial direction A.

Figure 9:
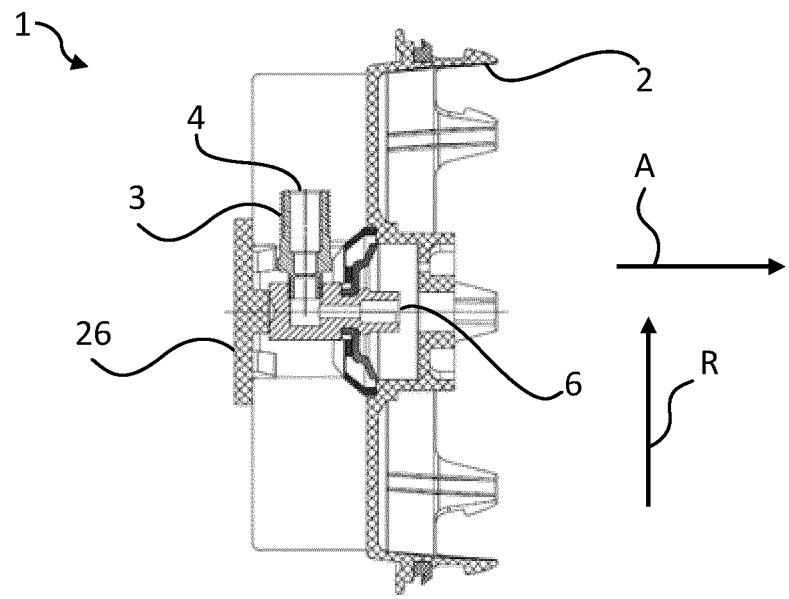
FIG. 9 is a sectional view of a hub cap system according to a further embodiment of the invention.

FIG. 9 shows a sectional view of a hub cap system 1. The air guiding system 3 is also arranged in a recess in the hub cap 2, with the secondary connection 4 of the air guiding system 3 oriented in the radial direction R. The recess of the hub cap 2 extends completely over the entire area of the hub cap 2 in the radial direction R. This makes it relatively easy to connect a fluid line to the secondary connection 4 in the radial direction R. The hub cap system 1 also comprises a protective element 26 in the form of a protective cap. This protective element 26 represents the distal end region of the hub cap 2 on the left-hand side as seen in axial direction A. The protective element 26 thus provides additional protection for the air guiding system 3 in axial direction A.

Figure 10:
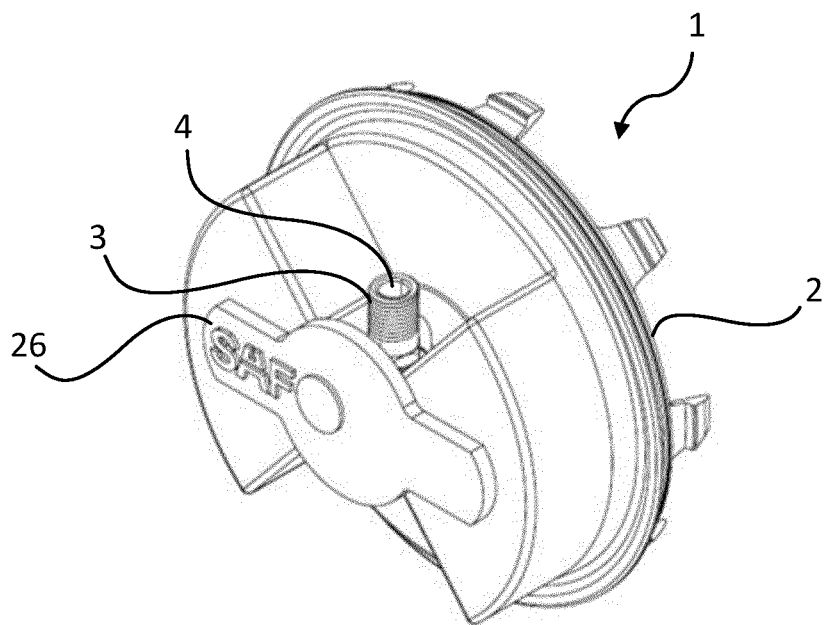
FIG. 10 is a perspective view of a hub cap system according to a further embodiment of the invention.

FIG. 10 shows a hub cap system 1. In this design example, the air guiding system 3 is also arranged in a recess in the hub cap 2 and is also protected by a protective element 26. The recess is shaped like a segment of a circle, whereby the recess provides good protection for the air guiding system 3 on the one hand, but at the same time also enables a good connection option to the air guiding system 3 due to the outwardly open design. Furthermore, this recess can be used to engage in the hub cap 2 with a tool, for example, in order to turn the hub cap 2 relative to a wheel hub.

Figure 11:
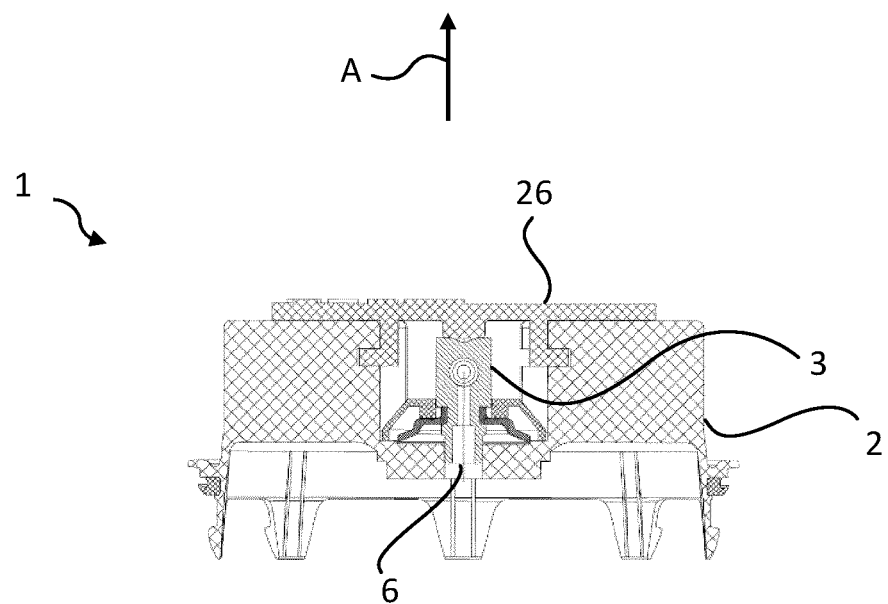
FIG. 11 is a sectional view of the hub cap system according to the embodiment of the invention shown in FIG. 10.

FIG. 11 shows a sectional view of the hub cap system 1, as also shown in FIG. 10. The protective element 26 is fixed in lateral recesses of the hub cap 2 by means of locking lugs.

Figure 12:
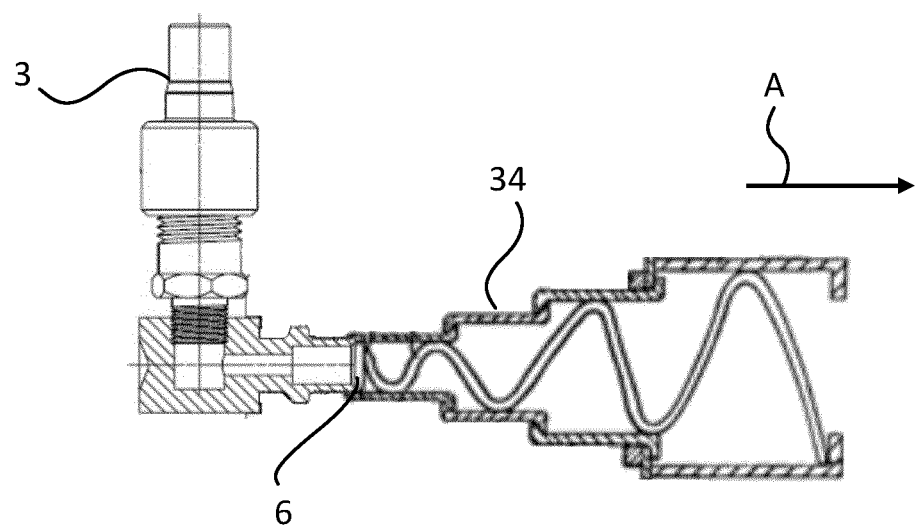
FIG. 12 is a lateral view of an air guiding system with a telescopic mechanism according to one embodiment of the invention.

FIG. 12 shows an air guiding system 3 with a telescopic mechanism 34, by means of which the air guiding system 3 can be displaced or retracted and extended in axial direction A. The air guiding system 3 can be displaced by pushing together or pulling apart the telescopic mechanism 34 or the individual components of the telescopic mechanism 34.

Figure 13:
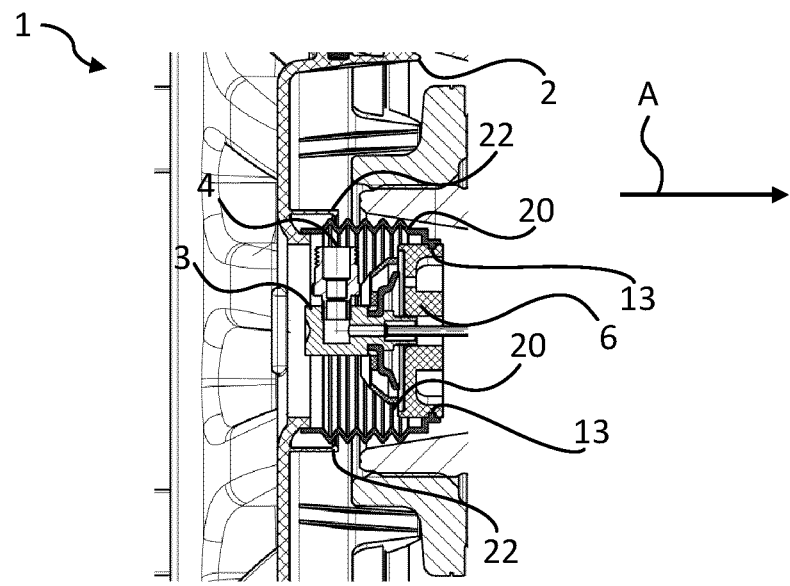
FIG. 13 is a sectional view of a hub cap system according to a further embodiment of the invention.
Figure 14:
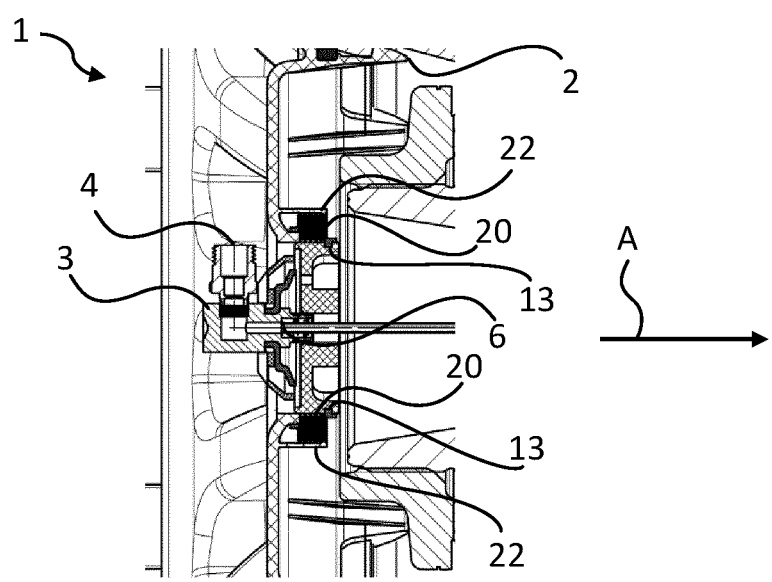
FIG. 14 is a further sectional view of the hub cap system according to the embodiment of the invention shown in FIG. 13.

FIGS. 13 and 14 each show a sectional view of a hub cap system 1 comprising a bellows device 20, which is extended in FIG. 13 and retracted in FIG. 14. If the bellows device 20 is extended, the air guiding system 3 is located completely inside the hub cap 2 and is therefore well protected from external influences. This positioning can be used in particular to transport the hub cap system 1 before installation in order to prevent damage to the air guiding system 3. In contrast, the air guiding system 3 in FIG. 14 is extended, in particular in axial direction A. The bellows device 20 engages in an undercut 13 of the air guiding system 3 in order to be able to move the air guiding system 3. Furthermore, the bellows device 20 can be fixed in its position by being fixed in its position by means of a hook element 22. The hook element 22 can be arranged completely around the bellows device 20. However, it can also, for example, comprise individual rods or hooks which engage in the bellows device 20.

Figure 15:
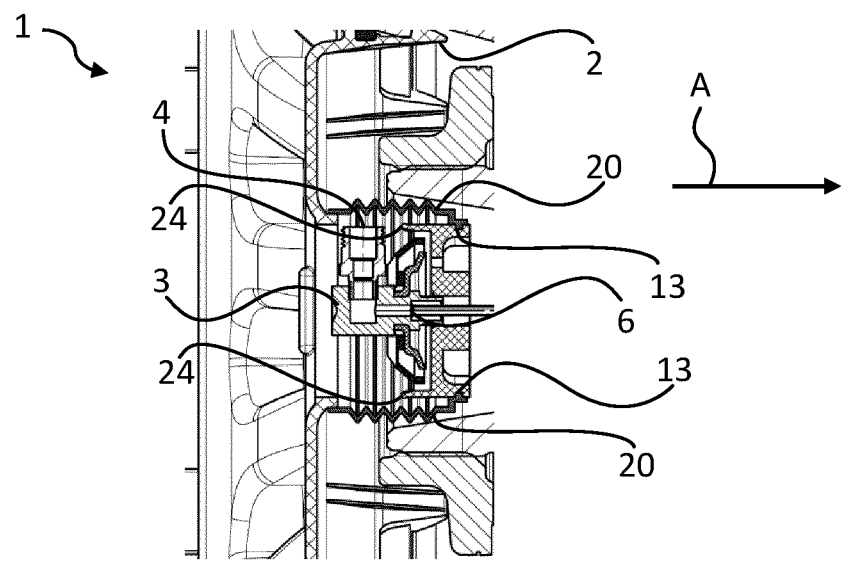
FIG. 15 is a sectional view of a hub cap system according to a further embodiment of the invention.
Figure 16:
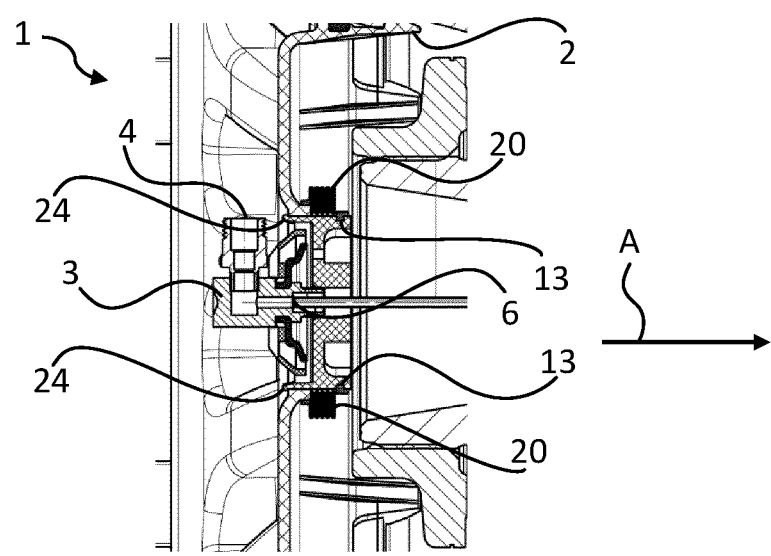
FIG. 16 is a further sectional view of the hub cap system according to the embodiment of the invention shown in FIG. 13.

FIGS. 15 and 16 show a sectional view of a hub cap system 1, which also has a bellows device 20, with which the air guiding system 3 can be displaced in axial direction A. FIG. 16 shows the air guiding system 3 in its extended position, in which the bellows device 20 is completely retracted. The air guiding system 3 can be fixed by means of locking lugs 24, which engage on an outer surface of the hub cap 2.

Figure 17:
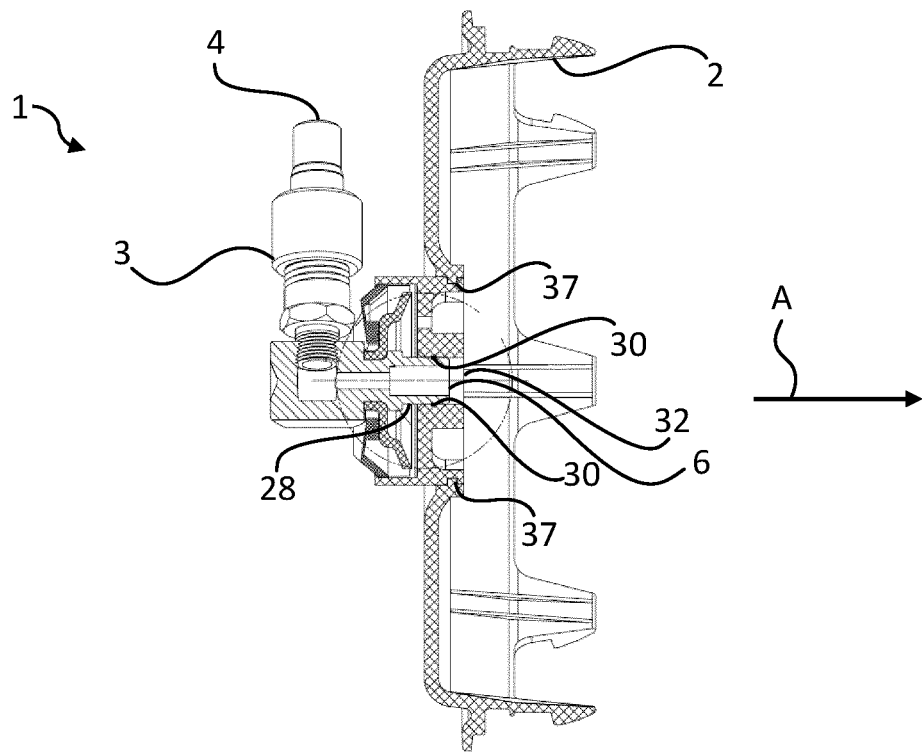
FIG. 17 is a sectional view of a hub cap system according to a further embodiment of the invention.
Figure 18:
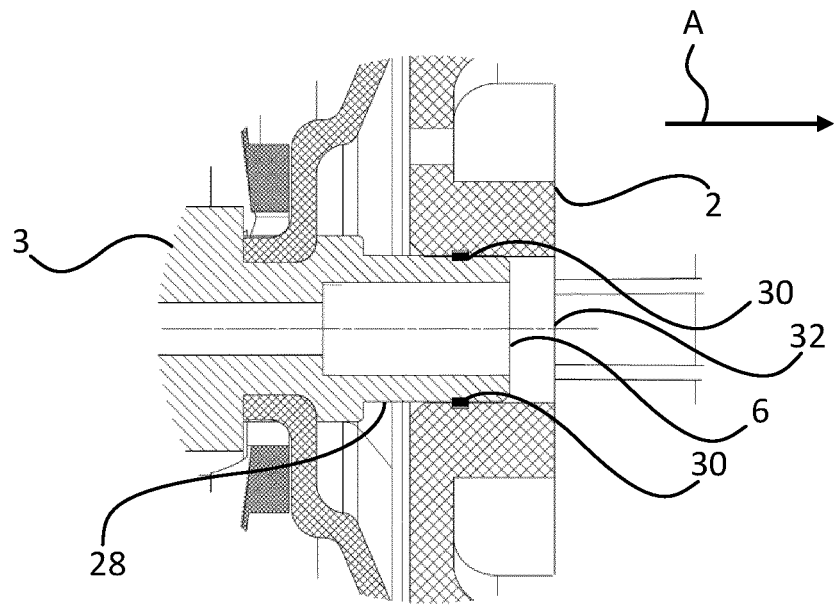
FIG. 18 is a further sectional view of the hub cap system according to the embodiment of the invention shown in FIG. 17.

FIGS. 17 and 18 show a hub cap system 1 with the air guiding system 3 fastened in the central aperture 32 of the hub cap 2 by means of fastening elements. Both the hub cap 2 in the central aperture 32 and the air guiding system 3 on the outside of its air guide tube 28 each have a circumferential groove, by means of which the air guiding system 3 is fixed to the hub cap 2 with the aid of a snap ring 30, which extends within these grooves. Alternatively, a clip mechanism or a latching mechanism for fastening in the central aperture 32 would also be conceivable. It would also be conceivable to provide a small adapter which performs a corresponding task of fastening in the central aperture 32.

Figure 19:
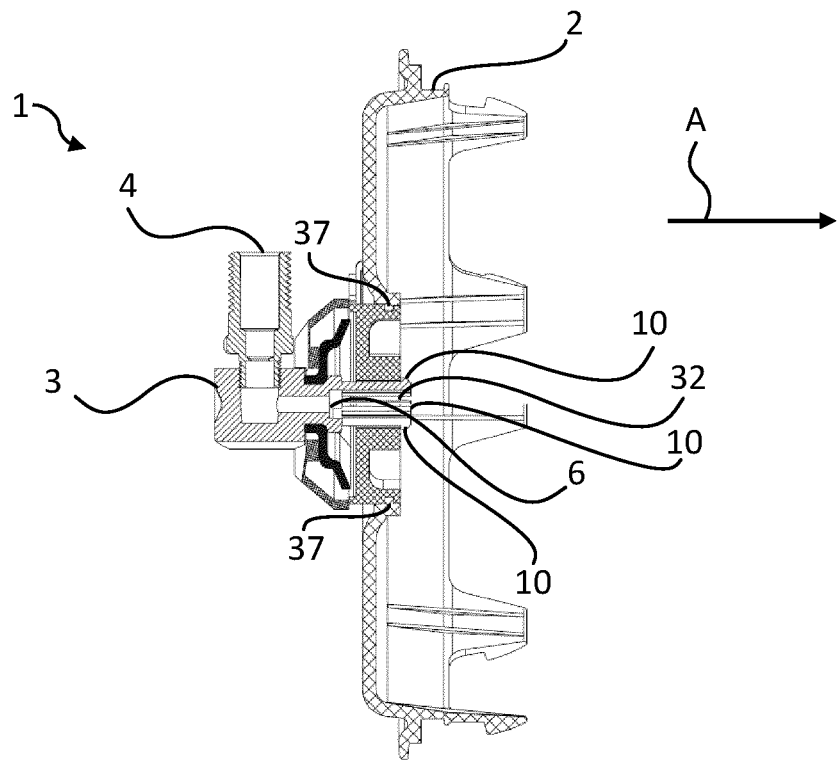
FIG. 19 is a sectional view of a hub cap system according to a further embodiment of the invention.
Figure 20:
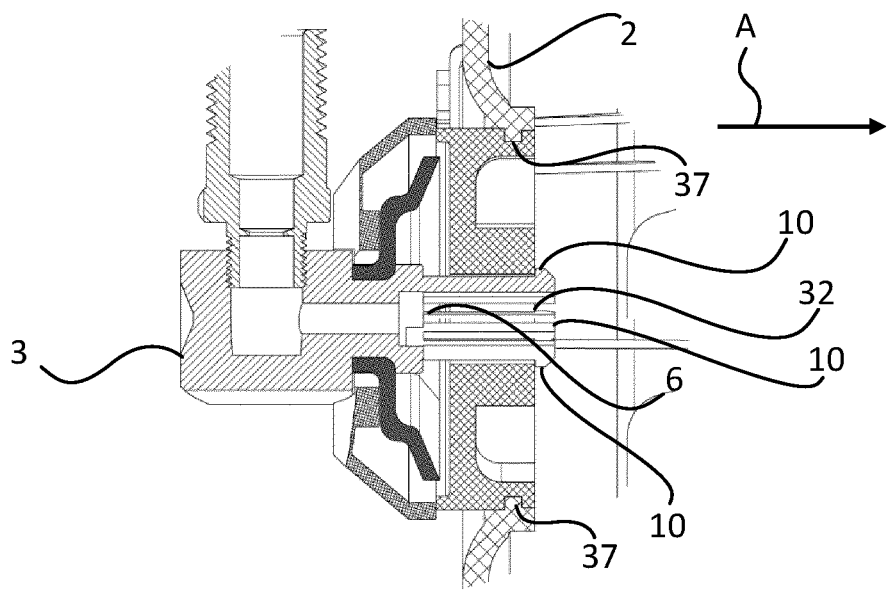
FIG. 20 is a further sectional view of the hub cap system according to the embodiment of the invention shown in FIG. 19.

FIGS. 19 and 20 show a sectional view of a hub cap system 1, whereby the air guiding system 3 has several latching fingers 10, which extend through the central aperture 32 and grip around the surface of the wheel hub at the mouth of the central aperture 32. This fixes the air guiding system 3 to the hub cap 2.

Figure 21:
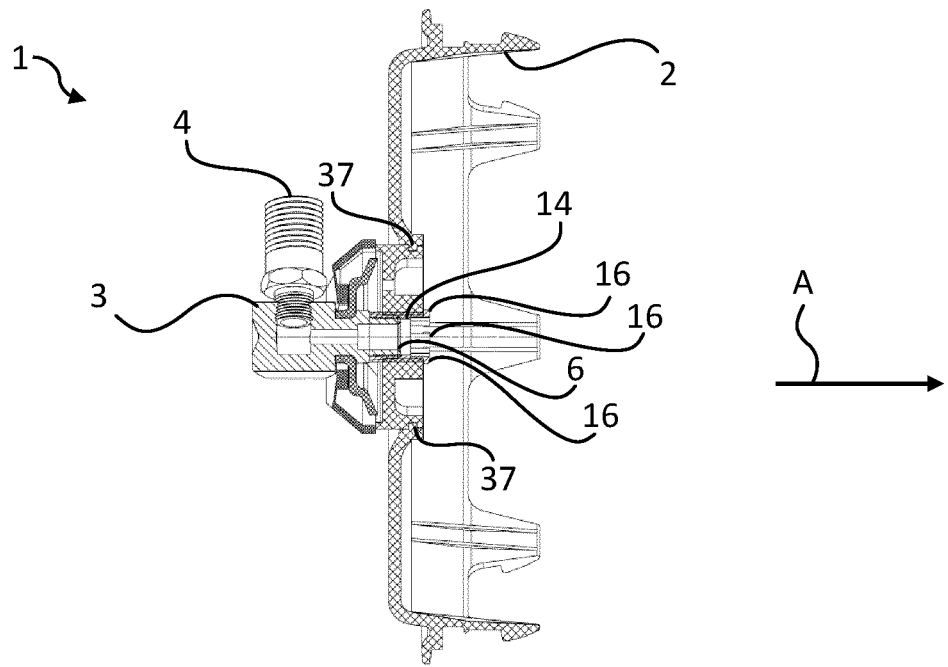
FIG. 21 is a sectional view of a hub cap system according to a further embodiment of the invention.
Figure 22:
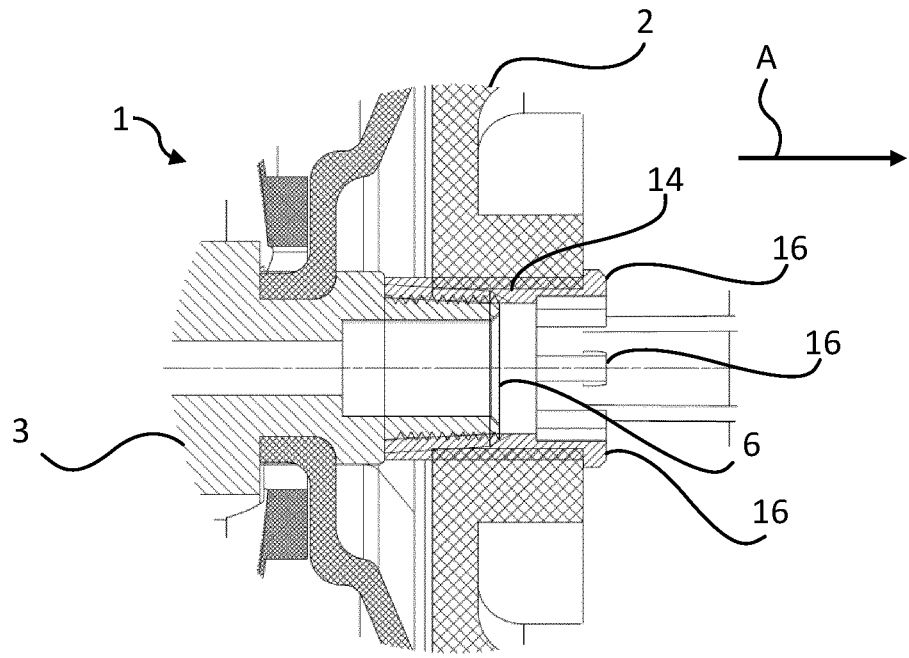
FIG. 22 is a further sectional view of the hub cap system according to the embodiment of the invention shown in FIG. 21.

FIGS. 21 and 22 show a further sectional view of a hub cap system 1, wherein the hub cap system 1 comprises an adapter element 14, which is designed as a dowel-like mechanism. The dowel-like mechanism comprises a plurality of latching fingers 16, which brace the adapter element 14 with the hub cap 2, in particular by engaging in a surface at the mouth of the central aperture 32 of the hub cap 2. The air guiding system 3 is screwed into the adapter element 14 and presses the latching fingers 16 of the adapter element 14 outwards, whereby the latching fingers 16 are braced in particular with the central aperture 32. In particular, it may be provided here that the adapter element 14 is first inserted into the central aperture 32 during installation and is then clamped to the hub cap 2 by screwing in the air guiding system 3.

Figure 23:
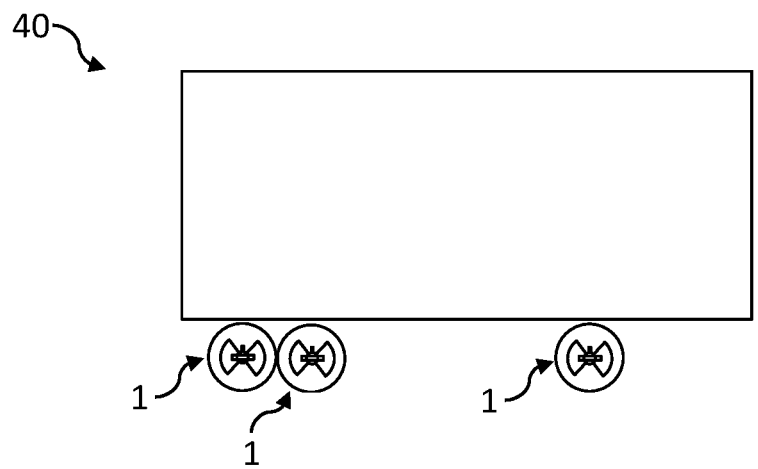
FIG. 23 is a schematic side view of a vehicle according to one embodiment of the invention.

FIG. 23 shows a vehicle 40, whereby this vehicle 40 comprises several hub cap systems 1 on its wheels. In this case, the vehicle 40 is a trailer. The hub cap system 1 corresponds to the invention, in particular the embodiment shown in FIG. 10. A combination of different embodiments of hub cap systems on different wheels and/or axles of the vehicle 40 is also conceivable.

Figure 24:
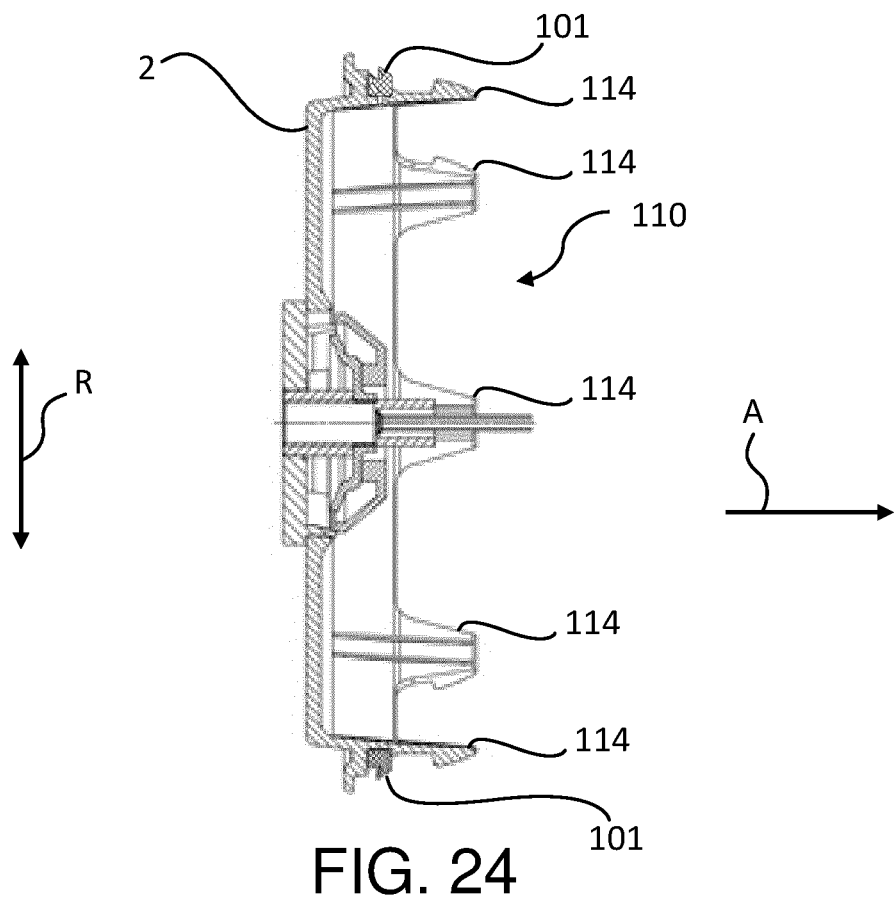
FIG. 24 is a sectional view of a hub cap system according to one embodiment.

FIG. 24 shows a sectional view of a hub cap system with a sealing ring 101 and a hub cap 2 according to one embodiment. The sealing ring 101 is arranged circumferentially around the hub cap 2 and is shown here in cross-section as in the following figures. The hub cap 2 comprises several fastening means 114 for clamping with a wheel hub. By placing the hub cap 2 on the wheel hub, an inner space 110 can be formed, which can be sealed to the outside with the aid of the sealing ring 101.

Figure 25:
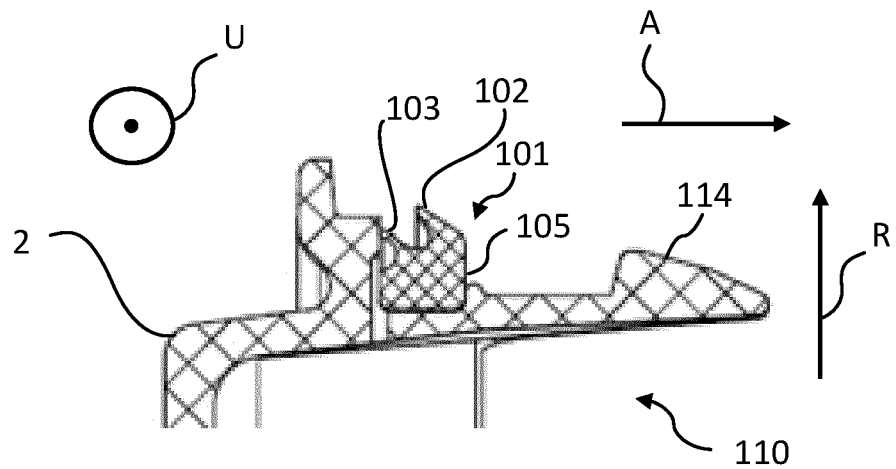
FIG. 25 is a sectional view of a sealing ring arranged on a hub cap according to a first embodiment.
Figure 26:
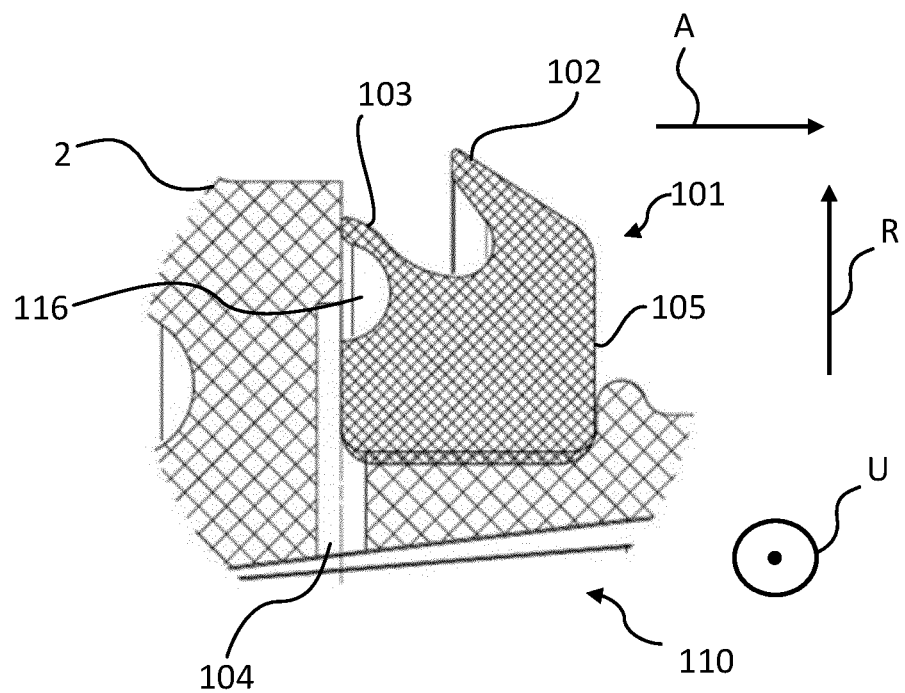
FIG. 26 is an enlarged sectional view of a sealing ring arranged on a hub cap according to a first embodiment.

FIGS. 25 and 26 show a sectional view of a sealing ring 101 arranged on a hub cap 2, which is shown here in section, according to a first embodiment. The sealing ring 101 comprises a primary sealing lip 102 for bearing against a wheel hub and a secondary sealing lip 103, which bears against the hub cap 2. Both the primary sealing lip 102 and the secondary sealing lip 103 adjoin the retaining area 105 of the sealing ring 101 and extend from there both in the axial direction A and in the radial direction R. In this embodiment, the retaining area 105 represents the main part of the sealing ring 101 and is arranged in a groove or on an attachment area of the hub cap 2. A receiving space 116 is arranged below the primary sealing lip 103 and enclosed by the primary sealing lip 103, the retaining area 105 and a side wall of the wheel hub 2. The receiving space 116 is fluidically connected by means of a connecting aperture 104 through the hub cap 2 to the interior 110 formed by the hub cap 2 and a wheel hub. An air line is provided from the inner chamber 110 to the receiving chamber 116 through the connecting aperture 104, whereby in particular the pressure in the receiving chamber 116 essentially corresponds to the pressure in the inner chamber 110. If the pressure in the interior 110 now exceeds a predetermined maximum pressure, the secondary sealing lip 103 is bent elastically upwards or essentially away in the positive radial direction R and a venting path is created via the connecting aperture 104, the receiving space 116 and past the secondary sealing lip 103. Air can escape from the interior 110 to the outside via this venting path until the pressure in the interior 110 is no longer above the predetermined maximum pressure. As soon as the pressure in the interior 110 is no longer above the maximum pressure, the secondary sealing lip 103 reconnects to the hub cap 2 and the venting path is closed again. In this state, no dirt or liquids can enter the interior 110, in particular due to the sealing ring 101 and the sealing lips 102, 103.

Figure 27:
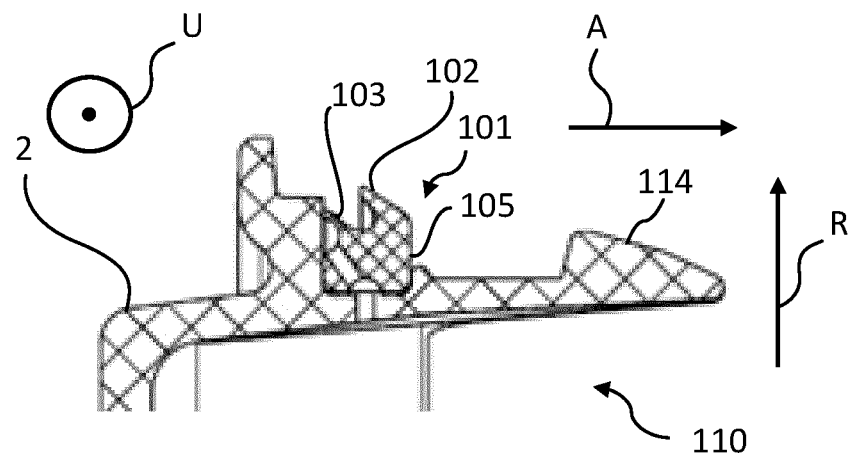
FIG. 27 is a sectional view of a sealing ring arranged on a hub cap according to a second embodiment.
Figure 28:
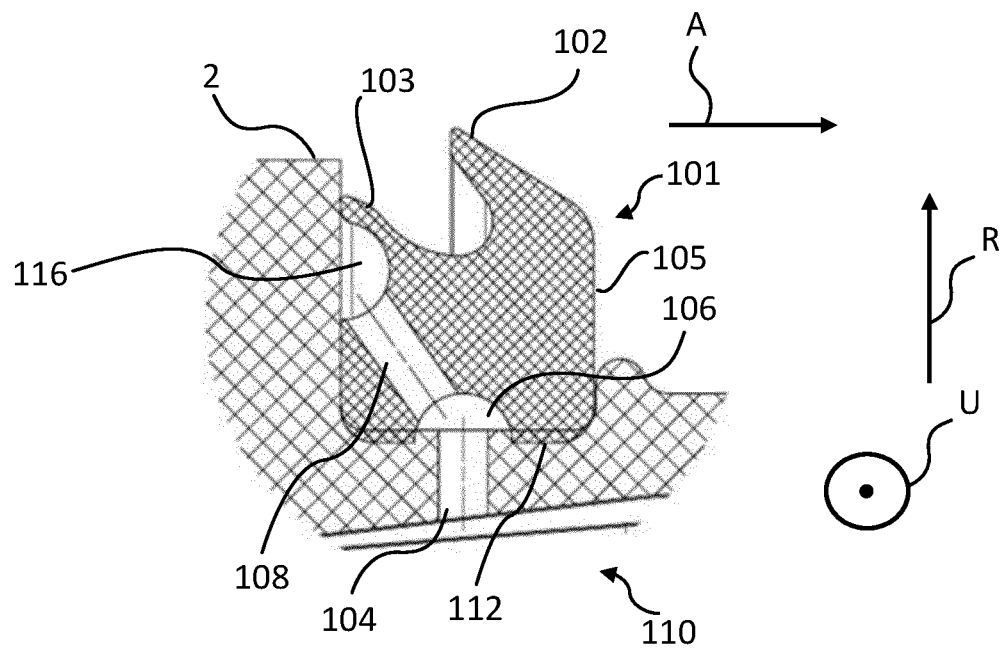
FIG. 28 is an enlarged sectional view of a sealing ring arranged on a hub cap according to the second embodiment.

FIGS. 27 and 28 show a sectional view of a sealing ring 101 arranged on a hub cap 2, which is shown here in section. In this embodiment, the sealing ring 101 also has a primary sealing lip 102 and a secondary sealing lip 103 as well as a retaining area 105. In this embodiment, the sealing lip 101 also has one or more apertures 108 in the direction of rotation U, one of which can be seen in this sectional view. The aperture 108 runs both in the radial direction R and in the axial direction A. It thus connects a channel 106, which is arranged in a bottom surface 112 of the sealing ring 101, with the receiving space 116, which is configured here in the same way as in the first embodiment shown in FIGS. 25 and 26. Both the channel 106 and the receiving space 116 have a constant cross-section in the direction of rotation U. Both are thus continuous and are connected at points by the apertures 108. To connect the channel 106 with the interior 110, the hub cap 2 has at least one connecting aperture 104. A venting path can be opened via the connecting aperture 104, the channel 106, the aperture 108 and the receiving space 116 if the secondary sealing lip 103 is elastically bent back in the interior 110 and thus also in the receiving space 116 in the event of excess pressure. Below a nominal pressure value, on the other hand, the secondary sealing lip closes by contacting the hub cap 2, while the primary sealing lip 102 also seals the interior 110 by contacting a connected wheel hub not shown here. In an assembled system comprising hub cap 2, wheel hub and sealing ring 101, the sealing ring 101 can thus ensure that no foreign bodies can enter the wheel hub or a wheel comprising the wheel hub from the outside.

Figure 29:
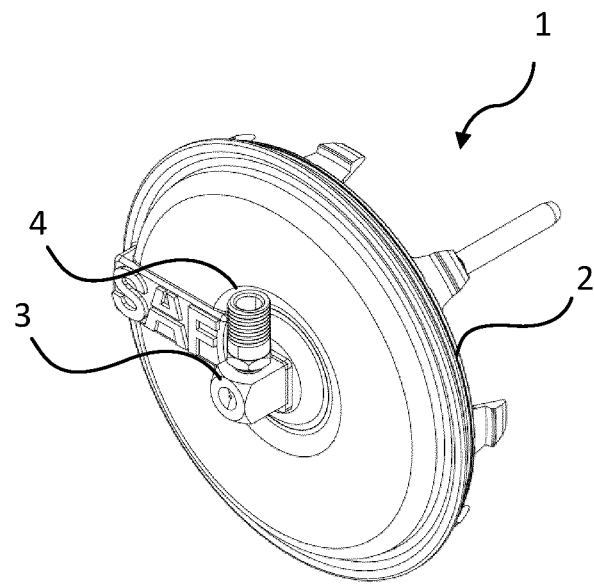
FIG. 29 is a perspective view of a hub cap system according to a further embodiment of the invention.
Figure 30:
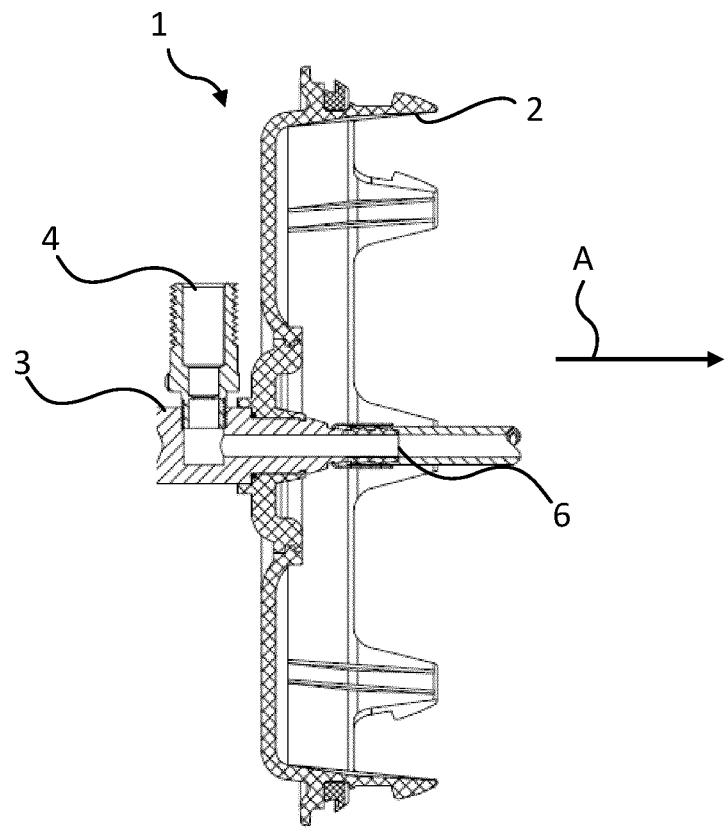
FIG. 30 is a sectional view of the hub cap system according to the embodiment of the invention shown in FIG. 29.

FIG. 29 shows a hub cap system 1 according to a further embodiment of the invention. FIG. 30 shows a sectional view of the hub cap system in FIG. 29. The hub cap system 1 comprises a hub cap 2 and an air guiding system 3, wherein the air guiding system 3 is in particular a rotary feedthrough. The air guiding system 3 has an external thread in the area of the secondary connection 4. The hub cap 2 is shaped on the outside in such a way that rotation of the air guiding system 3 relative to the hub cap 2 is prevented. Furthermore, the air guiding system 3 and the hub cap 2 are designed in such a way that the air guiding system 3 can only be attached to the hub cap 2 in one of four predetermined rotational positions about the axial direction A. The predetermined rotational positions are at equal angular distances from each other. In particular, fixing in the 0°, 90°, 180° and 270° positions is provided. The air guiding system 3 comprises an essentially square section. The square is designed to be inserted into the hub cap from the outside. The embodiment shown here can be combined in particular with one of the other embodiments for protecting the air guiding system 3.

LIST OF REFERENCE SYMBOLS

1 Hub cap system
2 Hub cap
3 Air guiding system
4 Secondary connection
6 Primary connection
8 Collar element
10 Resting fingers of the air duct system
11 Hub cap locking finger
12 Undercut of the hub cap
13 Undercut of the air duct system
14 Adapter element
15 Surface of the adapter element
16 Resting fingers of the adapter element
18 Latching position
20 Bellows device
22 Hook element
24 Latching lug
26 Protective element
28 Air duct pipe
30 Brittle ring
32 Central breakthrough
34 Telescopic mechanism
36 Central body
37 Fasteners for central and mounting bodies
38 Mounting body
40 Vehicle
101 Sealing ring
102 Primary sealing lip
103 Secondary sealing lip
104 Connection breakthrough
105 Holding area
106 channel
108 Breakthrough
110 Interior
112 Floor area
114 Fasteners
116 Recording room
A Axial direction
R Radial direction
U Direction of rotation

The invention claimed is:

1. A hub cap system for a vehicle comprising: a hub cap configured to rotate about an axial direction, wherein the hub cap has a central aperture which extends in the axial direction; and an air guiding system including a primary connection and a secondary connection, wherein the air guiding system extends partially into or through the central aperture, and wherein the air guiding system is translationally displaceable and/or extendable relative to the hub cap in the axial direction; wherein the air guiding system is configured to be transferred from a first position to a second position, wherein the air guiding system projects beyond the hub cap in the second position as seen in the axial direction, and wherein the air guiding system does not project beyond the hub cap in the first position as seen in the axial direction.

2. The hub cap system according to claim 1, further comprising: a bellows device for retracting and extending and/or displacing the air guiding system in the axial direction.

3. A vehicle, comprising a hub cap system according to claim 1.

4. The vehicle according to claim 3, wherein the vehicle comprises a commercial vehicle.

5. A method for mounting a hub cap system with a hub cap and an air guiding system for a tire pressure regulation system, comprising: translationally displacing the air guiding system in the axial direction into a first position such that the air guiding system does not project beyond the hub cap as seen in the axial direction of the hub cap; providing the hub cap system; installing the hub cap system in a vehicle and/or in a wheel of a vehicle; and translationally displacing the air guiding system in the axial direction into a second position such that the air guiding system projects beyond the hub cap at least on one side when viewed in the axial direction of the hub cap.

6. The method according to claim 5, wherein the air guiding system is reversibly connected to the hub cap.

7. The method according to claim 6, wherein the air guiding system and/or the hub cap comprises an inner or outer undercut running at least in sections around the axial direction, and wherein the other of the hub cap and the air guiding system comprises at least one latching finger configured to engage in the undercut, wherein the air guiding system is configured to be fixed to the hub cap via the undercut and the at least one latching finger.

8. The method according to claim 6, wherein the air guiding system and/or the hub cap is configured such that the air guiding system is held in a positively-locking, rotationally fixed manner relative to the hub cap.

9. The method according to claim 6, wherein the air guide system and/or the hub cap is configured such that the air guide system can only be attached to the hub cap in one or more predetermined rotational positions about the axial direction.

\* \* \* \* \*